United States Patent
Oshel et al.

(10) Patent No.: US 11,612,927 B2
(45) Date of Patent: Mar. 28, 2023

(54) SYSTEM AND METHOD FOR FLEXIBLE MANUFACTURING

(71) Applicant: ATS AUTOMATION TOOLING SYSTEMS INC., Cambridge (CA)

(72) Inventors: Glenn Oshel, Milford, MI (US); John Graham, Rochester, MI (US); Gregory J. Farrow, Fergus (CA); Nhan Huu Nguyen, Cambridge (CA)

(73) Assignee: ATS AUTOMATION TOOLING SYSTEMS INC., Cambridge (CA)

( * ) Notice: Subject to any disclaimer, the term of this patent is extended or adjusted under 35 U.S.C. 154(b) by 398 days.

(21) Appl. No.: 16/503,912

(22) Filed: Jul. 5, 2019

(65) Prior Publication Data

US 2020/0009634 A1   Jan. 9, 2020
US 2021/0197244 A9   Jul. 1, 2021

Related U.S. Application Data

(60) Provisional application No. 62/694,479, filed on Jul. 6, 2018.

(51) Int. Cl.
*B23Q 1/62* (2006.01)
*B23Q 3/155* (2006.01)
*B23Q 37/00* (2006.01)
*B23Q 41/02* (2006.01)
*B23Q 41/04* (2006.01)
(Continued)

(52) U.S. Cl.
CPC ....... *B21D 28/246* (2013.01); *B23Q 3/15566* (2013.01); *B23P 23/04* (2013.01); *B23Q 1/626* (2013.01); *B23Q 7/1447* (2013.01); *B23Q 37/00* (2013.01); *B23Q 41/02* (2013.01); *B23Q 41/04* (2013.01); *Y10T 29/5124* (2015.01); *Y10T 29/5135* (2015.01); *Y10T 29/5196* (2015.01);
(Continued)

(58) Field of Classification Search
CPC .............. Y10T 483/16; Y10T 483/165; Y10T 29/5124; Y10T 29/5135; Y10T 29/5196; Y10T 483/1729; Y10T 483/1731; Y10T 83/8732; B23Q 7/14–1494
USPC ......... 483/14–15, 28–29; 29/563, 33 P, 38.9; 82/552
See application file for complete search history.

(56) References Cited

U.S. PATENT DOCUMENTS 840,859 A * 1/1907 Morse .................... B23D 51/20
                                                    83/554
3,154,979 A * 11/1964 Crispin ................. B23Q 1/5481
                                                     29/34 B
(Continued)

OTHER PUBLICATIONS

Canadian Intellectual Property Office as International Searching Authority, International Search Report for PCT/CA2019/050931, dated Aug. 28, 2019.
(Continued)

*Primary Examiner* — Erica E Cadugan
(74) *Attorney, Agent, or Firm* — Neil W. Henderson

(57) ABSTRACT

The system includes a cell framework for defining a manufacturing area. The system includes at least one workplace within the manufacturing area. The system includes at least one manufacturing component within the manufacturing area and configured to be movable along three axes in relation to the at least one workplace. The system includes a conveying mechanism configured to move a part into the at least one workplace to be worked on by the at least one manufacturing component.

10 Claims, 18 Drawing Sheets

(51) Int. Cl.
*B23Q 7/14* (2006.01)
*B21D 28/24* (2006.01)
*B21D 37/04* (2006.01)
B23P 23/04 (2006.01)

(52) U.S. Cl.
CPC ...... *Y10T 483/165* (2015.01); *Y10T 483/1731* (2015.01)

(56) References Cited

U.S. PATENT DOCUMENTS

| | | | | |
|---|---|---|---|---|
| 3,576,540 | A | * | 4/1971 | Fair ................... B23Q 41/00 483/15 |
| 4,682,401 | A | * | 7/1987 | Tadashi ............... B23D 31/00 483/14 |
| 4,719,691 | A | * | 1/1988 | Klingel ............... B21D 28/12 483/29 |
| 4,887,345 | A | | 12/1989 | Saito et al. |
| 5,103,963 | A | * | 4/1992 | Sticht ................. B23P 23/06 198/465.1 |
| 5,970,832 | A | * | 10/1999 | Aizawa ............... B21D 28/12 83/277 |
| 7,150,706 | B2 | | 12/2006 | Grob |
| 8,523,500 | B2 | | 9/2013 | Yamaura et al. |
| 2016/0023316 | A1 | * | 1/2016 | Feinauer ............. B23Q 39/024 29/558 |
| 2017/0080502 | A1 | | 3/2017 | Geissler |

OTHER PUBLICATIONS

Canadian Intellectual Property Office as International Searching Authority, Written Opinion for PCT/CA2019/050931, dated Aug. 28, 2019.

* cited by examiner

SYSTEM AND METHOD FOR FLEXIBLE MANUFACTURING

RELATED APPLICATIONS

The present disclosure claims priority to the U.S. Provisional Application No. 62/694,479 filed Jul. 6, 2018, which is hereby incorporated by reference.

FIELD

The present disclosure relates generally to a system and method for flexible manufacturing. More particularly, the present disclosure relates to a system and method for flexible manufacturing that includes a press, a quick-exchange tooling apparatus, and modular moveable elements allowing fully automatic or semi-automatic manufacturing.

BACKGROUND

Flexible manufacturing has become more and more important in industry due to the rapid pace of change and the desire of consumers to personalize products. Manufacturing equipment needs to be more adaptable so that it is easier to make changes without large downtime in between production runs.

Conventional flexible manufacturing systems typically involve components/elements such as overhead cranes or robots that allow for x-y movement above a work area so that various tools can be kept on a nearby tool rack or the like and then provided to the crane/robot when moved away from a work area. One of the elements that has been difficult to include in these flexible manufacturing systems is a press. Some systems involve a press hanging from an overhead support beam. However, press forces that can then be applied to a part or parts are limited by the maximum loading on the overhead beams. Other systems involve the use of a press and a table where a part is moved along the table under the press. These systems are limited because the table is positioned between the press plates. Thus, the table can prevent/inhibit changeover of tooling on the press plates. Further, it can be difficult to complete other types of operations on a part (for example, diagnostic testing, manual assembly, and/or the like) while it is at the press and the part may need to be moved to another station for these operations.

As such, there is a need for an improved system and method for flexible manufacturing that overcomes at least some of the noted issues.

SUMMARY

According to an aspect herein, there is provided a system for flexible manufacturing having: a cell framework for defining a manufacturing area; at least one workplace within the manufacturing area; at least one manufacturing component within the manufacturing area and configured to be movable along multiple axes in relation to the at least one workplace; and a conveying mechanism configured to move a part into the at least one workplace to be worked on by the at least one manufacturing component.

In some cases, the manufacturing component may be a press.

In other cases, the press may be configured in a C-shape with pressing along a horizontal axis.

In still other cases, the press may include a tool exchanger mounted to the press, wherein the tool exchanger is configured to allow at least two tools to be alternatively mounted to the press, and the tool exchanger is oriented with the press to allow the press to transmit a press force to the tool but not to the tool exchanger.

In still other cases, the manufacturing component may be movable in relation to the workplace during a manufacturing cycle for accurate positioning.

In still other cases, the manufacturing component may be movable in relation to the workplace during a manufacturing cycle for accurate positioning or multiple operations.

In still other cases, the at least one workplace may include at least two workplaces wherein a first workplace is accessible to the at least one manufacturing component and a second workplace is accessible to an operator for manual operations and the system further includes a pallet configured to be movable between the at least two workplaces.

In still other cases, the at least one manufacturing component may include at least two manufacturing components and the at least one workplace and the at least two manufacturing components are each positioned and oriented in the manufacturing area to allow each of the at least two manufacturing components to operate on a part at the at least one workplace substantially simultaneously.

In still other cases, the manufacturing area may include a first manufacturing area and the system may include a second manufacturing area attached to the first manufacturing area in a modular fashion, the at least one workplace may include a common workplace, and the second manufacturing area is positioned and oriented to position the common workplace between the first and second manufacturing areas.

In another aspect, there is provided a system for flexible manufacturing having: a cell framework defining a manufacturing area for completing an automated operation on at least one part, the cell framework having a base surface; at least one workstation within the manufacturing area having a part fixture for receiving the part; at least one machine press; a moveable base supporting the machine press on the base surface; and a positioning mechanism coupled to the moveable base for moving the machine press between: (a) an operating position at the workstation for completing the automated operation on the part within the part fixture, and (b) a standby position away from the part fixture.

In some cases, the machine press may be a C-shaped press having an actuation path; wherein the actuation path is aligned with the part fixture when the machine press is in the operating position, and wherein the actuation path is unobstructed by the part fixture when in the standby position.

In other cases, the positioning mechanism may cooperate with the moveable base to move the machine press along a plurality of mutually orthogonal axes in relation to the workplace.

In still other cases, the positioning mechanism may include an X-Y axis slide for moving the moveable base along the base surface, and a Z-axis slide for adjusting height of the machine press.

In still other cases, the press may include a tool exchanger that is mounted to the machine press, the tool exchanger having at least two tools and a rotatable turret for selectively positioning one of the at least two tools in alignment with the actuation path of the machine press.

In still other cases, the tool exchanger may include a tool-coupling, and wherein the tool exchanger is oriented with the press to allow the machine press to transmit a press force to one of the at least two tools via the tool coupling without transmitting the press force to the tool exchanger In still other cases, the machine press may be movable to a plurality of operating positions in relation to the workstation during a manufacturing cycle for at least one of: accurate positioning of the machine press, and performance of multiple automated operations.

In still other cases, the at least one workplace is accessible to the machine press inside the cell framework to perform an automatic operation, and wherein the system further includes at least one additional workplace accessible to an operator outside the cell framework to perform a manual operation, and the fixture is moveable between the at least one workplace and the at least one additional workplace.

In still other cases, the at least one additional workplace is positioned outside the cell framework for completing the manual operation, and the system further includes a transfer receptacle at each workplace for moving the part fixture between the at least one workplace and the at least one additional workplace.

In still other cases, the manufacturing area is a first manufacturing area and the system further includes a second manufacturing area attached to the first manufacturing area in a modular fashion, the at least one workplace includes a common workplace, and the second manufacturing area is positioned and oriented to position the common workplace between the first and second manufacturing areas.

In another aspect, there is provided a tool exchanger for use in a manufacturing component having: a turret rotatably coupled to the manufacturing component; wherein the turret includes: a plurality of tool-mounting structures operatively connected to the turret; a plurality of tool-couplings, wherein each of the plurality of tool-couplings is positioned and oriented within a respective tool-mounting structure to align, in sequence, each of the plurality of tool-couplings with an actuation path when the turret is rotated, wherein alignment of one of the plurality of tool-couplings with the actuation path selects that one of the plurality of tool couplings; and a tool-indexing servo coupled to the manufacturing component to rotate the turret relative to the housing; wherein the turret is positioned within the actuation path wherein: movement of a mounted tool along the actuation path to a first position couples the mounted tool to the selected tool-coupling and configures the tool-exchanger in an operation mode; and movement of the mounted tool along the actuation path to a second position decouples the mounted tool from the selected tool coupling and configures the tool-exchanger in an indexing mode.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a manufacturing system for flexible manufacturing. The manufacturing system includes a cell framework defining a manufacturing area, at least one workplace within the manufacturing area, and at least one manufacturing component configured to be movable within the manufacturing area in relation to the at least one workplace. The manufacturing system also has a conveying mechanism configured to move a part or workpiece into the at least one workplace to be worked on by the at least one manufacturing component.

In some embodiments, the manufacturing component includes a multiple-axis sliding structure, a C-frame provide to the multiple-axis sliding structure and movably coupled to the multiple-axis sliding structure, and one or more tools demountably coupled to the C-frame.

The multiple-axis sliding structure may be movable in a three-dimensional (3D) space of the manufacturing area, for example along mutually orthogonal x, y, and z axes, and, in particular, about the workplace for precisely positioning one or more tools at desired 3D positions with respect to the workplace and/or the components therein such as a pallet, a fixture, or a workpiece to be operated on.

In some embodiments, the tools may include a press coupled to the C-frame and configured for applying an enhanced press force to the workpiece. In some embodiments, the press may be a rotatable press. In some embodiments, the press may be a machine press. In some embodiments, the press is intended to have an actuation path. In some cases, a tool exchanger having a plurality of tools can be coupled to the C-frame and may include a lower end of the rotatable press. The tool exchanger may be rotated to select a tool. The press may engage and drive the selected tool without transmitting the press force to the tool exchanger.

In some embodiments, the manufacturing system may include two or more workplaces accessible to the manufacturing component. In some embodiments, the manufacturing system may include two or more manufacturing components accessible to a common workplace. Depending on the configuration and manufacturing needs, the two or more manufacturing components may operate on or with a same workpiece or separate workpieces, and the two or more manufacturing components may operate in parallel or in serial.

In some embodiments, the above-described manufacturing system is modularized and forms a manufacturing module that may be used with other modules to form an expanded manufacturing system. For example, such a modular manufacturing module may be coupled with one or more robot modular modules in a "front-to-front" manner and/or a "side-by-side" manner to allow the robots in the robot modules to access the workplace of the manufacturing module and the workpieces therein.

Figure 1:
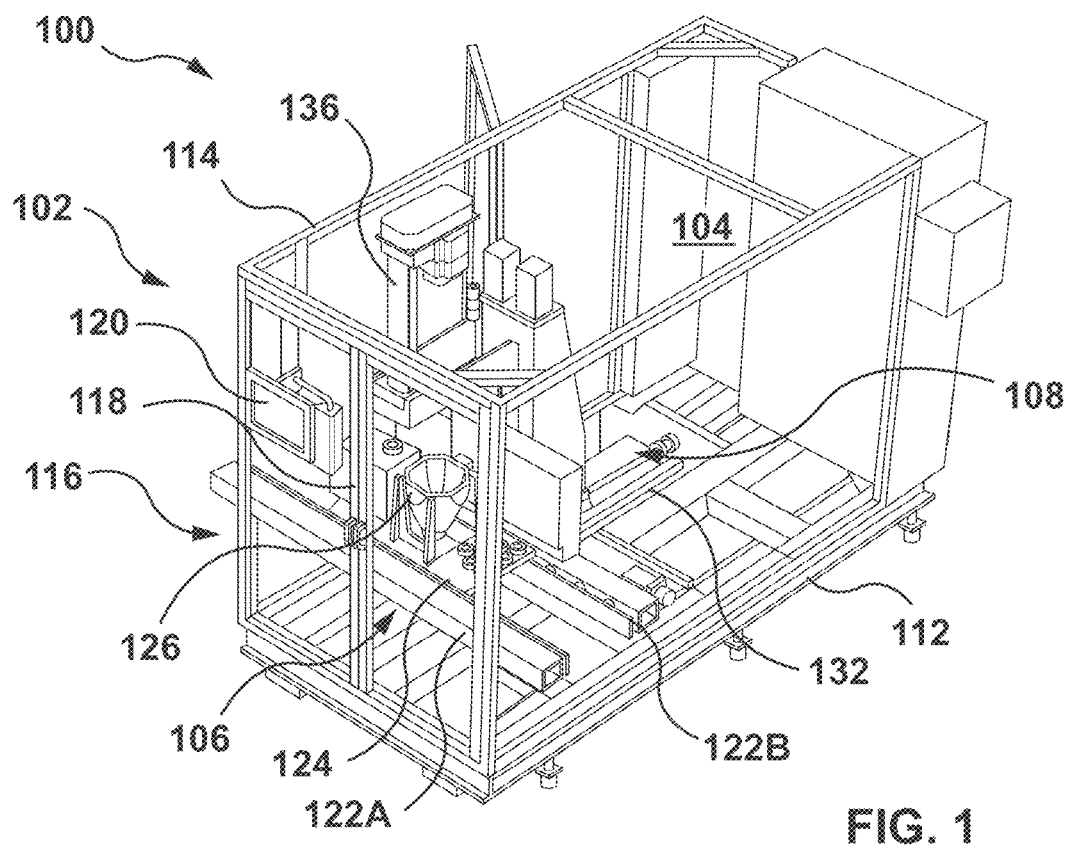
FIGS. 1 and 2 are perspective views of a manufacturing system having a workplace and a manufacturing component, according to some embodiments of this disclosure.
Figure 2:
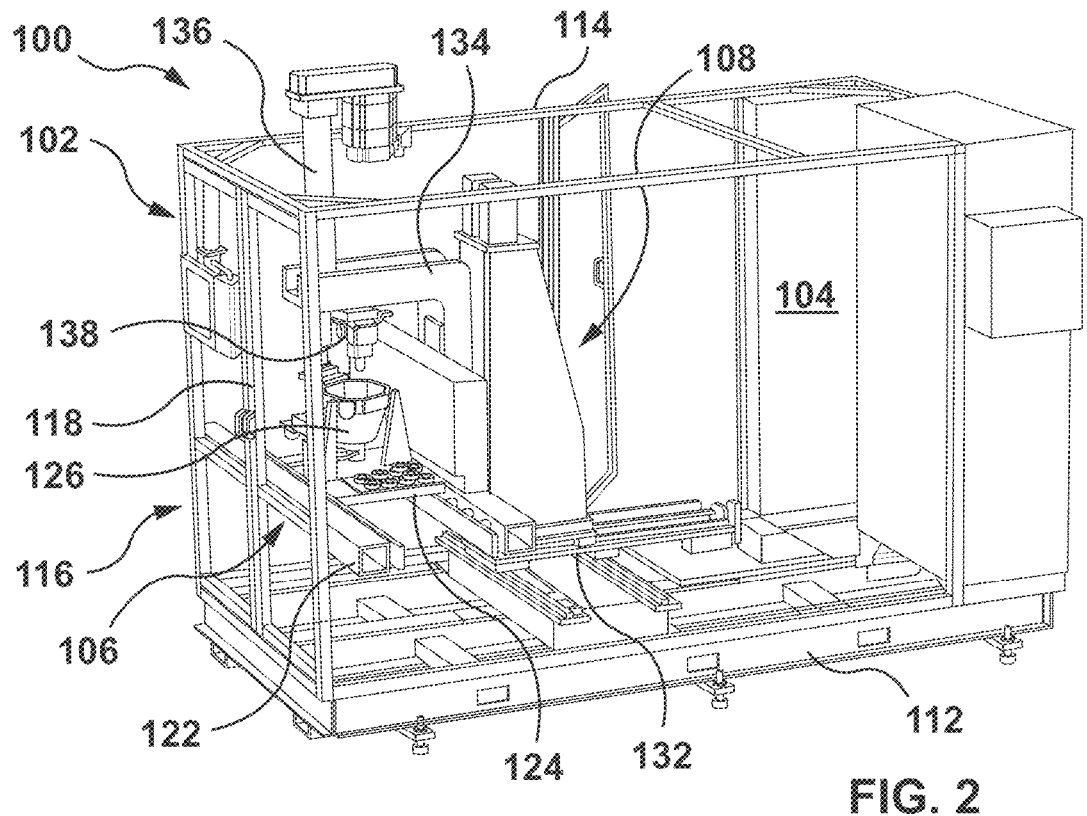
Figure 3:
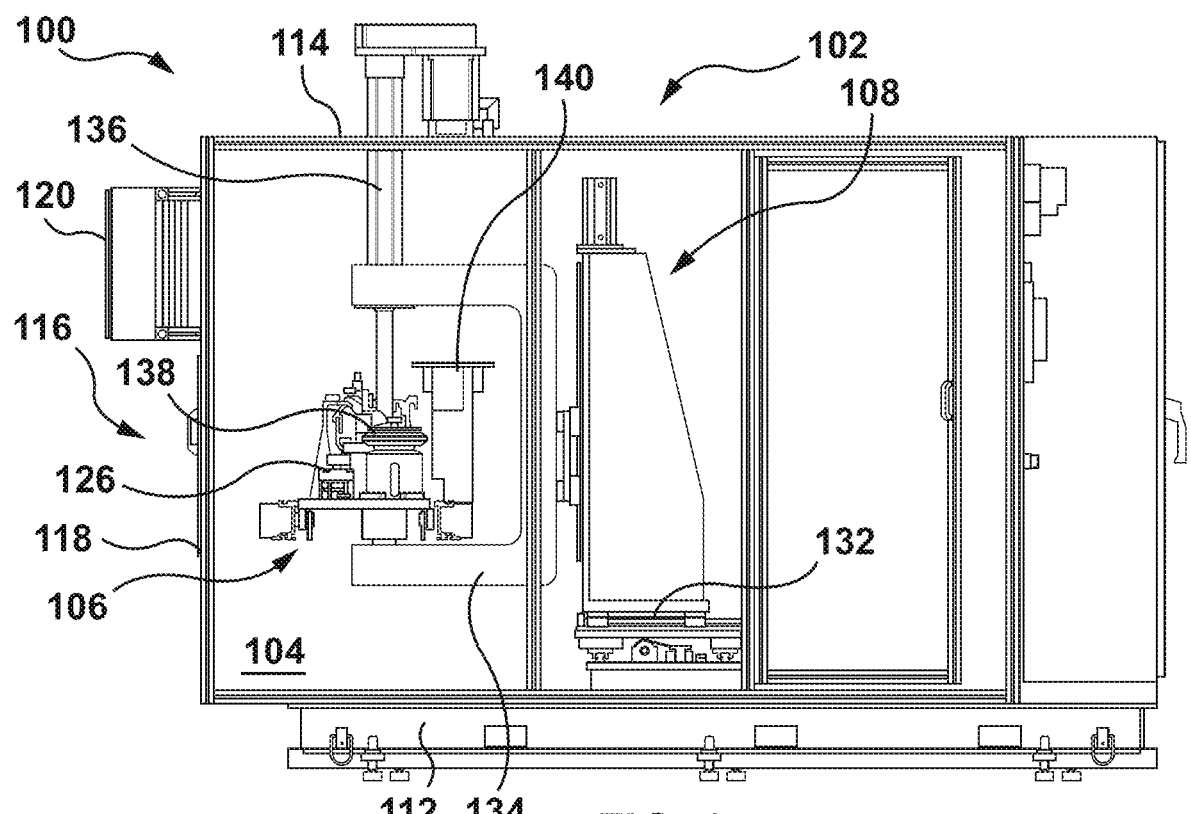
FIG. 3 is a side view of the manufacturing system shown in FIG. 1.

Turning now to FIGS. 1 to 3, a manufacturing system is shown and is generally identified using reference numeral 100. As shown, the manufacturing system 100 includes a cell framework 102 defining a 3D manufacturing area 104 therewithin which includes a workplace 106 and a manufacturing component 108. In this embodiment, the workplace 106 and the manufacturing component 108 are arranged along a longitudinal direction.

The cell framework 102 in these embodiments is formed by a base structure 112 and a frame 114 thereabove. The frame 114 includes a front entrance 116 having one or more doors 118, and a console or control terminal 120, which may be mounted at or near the front entrance 116. As will described in more detail below, the manufacturing system 100 may be configured in an automatic manufacturing mode in which the doors 118 may be closed for safety, or may be configured in a semi-automatic manufacturing mode in which the doors 118 may be open for an operator to access the workplace 106 and other components in the manufacturing area 104 as needed.

In these embodiments, the workplace 106 includes a supporting structure fixed in the manufacturing area 104 near the front entrance 116 for supporting a pallet 124. The manufacturing system 100 includes a conveying mechanism illustrated by a pair of tracks 122A and 122B provided with one or more rollers and/or conveyor belts for moving a pallet 124 into the workplace 106. The tracks 122 may be mounted to the frame 114 or may be at a small distance from the frame 114 as shown in FIG. 3. The pallet 124 may include a fixture 126 for holding one or more parts or workpieces to be operated on. In some cases, the fixture 126 may allow for the one or more workpieces to be moved independently.

The manufacturing component 108 may include a sliding structure 132, a C-frame 134 vertically movably coupled to the sliding structure 132, and one or more tools coupled to the C-frame 134. The sliding structure 132 is intended to allow for the positioning of the C-frame 134 coupled with one or more tools. The one or more tools may include one or more permanently-mounted tools such as a press 136 and/or one or more quick-exchange tools 138 that may be demountably installed onto the C-frame 134 as needed via a tool exchanger 140. In some cases, mounted tools may be decoupled from the C-frame 134 to allow coupling of another mounted tool to C-frame 134. In some cases, the tools may be installed beside the press 136. In other cases, the tools may be installed onto the press 136.

Figure 4:
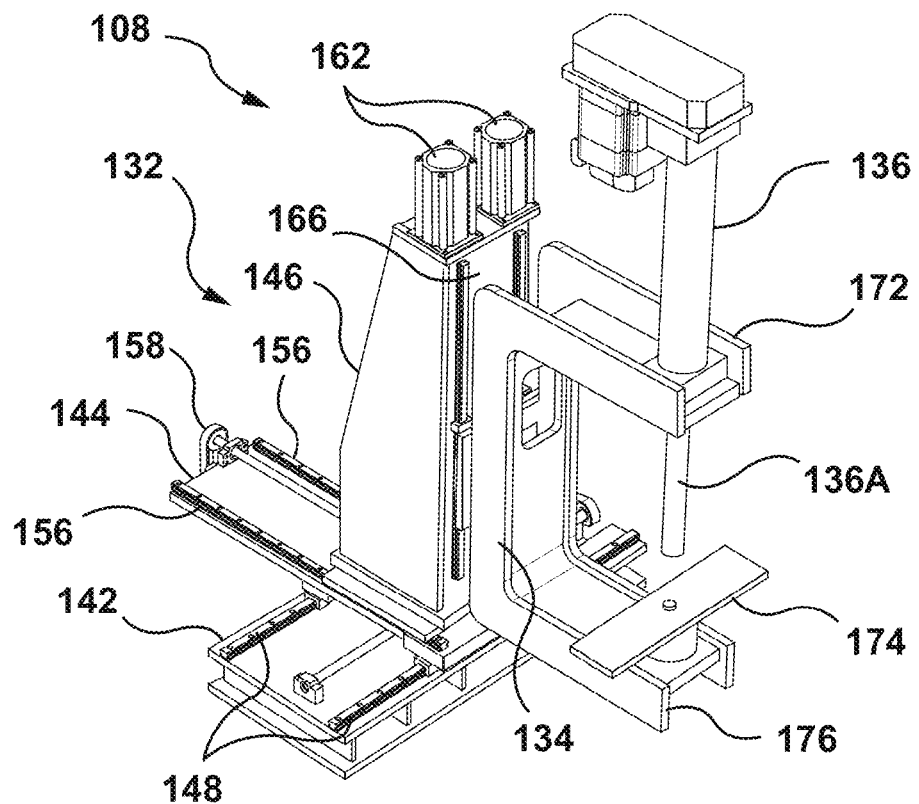
FIG. 4 is a perspective view of the manufacturing component of the manufacturing system shown in FIG. 1 which includes a sliding structure, a C-frame, and a press, wherein the sliding structure is a multiple-axis sliding structure movable in a 3D space along mutually-orthogonal x, y, and z axes.
Figures 5, 6:
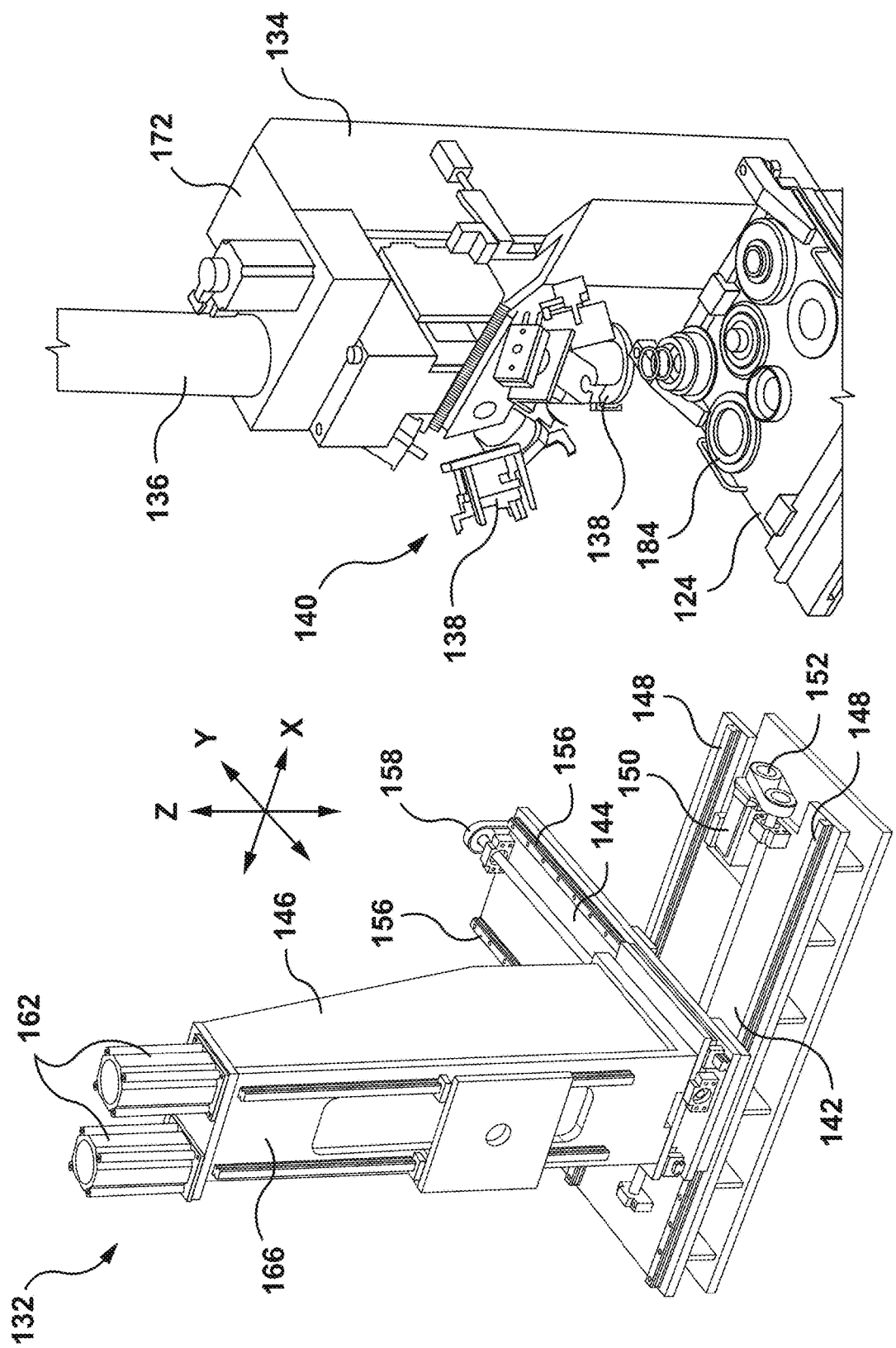
FIG. 5 is a perspective view of the sliding structure of the manufacturing component shown in FIG. 4, wherein a C-frame-mounting surface of the sliding structure faces front.
FIGS. 6 and 7 are perspective views of a C-frame of the manufacturing component shown in FIG. 4, wherein a tool exchanger having with a plurality of tools is coupled to an upper arm of the C-frame.

As shown in FIGS. 4 and 5, the sliding structure 132 in these embodiments is a multiple-axis sliding structure and is movable within the manufacturing area 104 along three mutually-orthogonal axes x, y, and z. In particular, the multiple-axis sliding structure 132 includes a lateral slider base 142 mounted on the base structure 112 (see FIGS. 1 to 3) or on the ground. The lateral slider base 142 includes a pair of parallel rails 148 laterally extending along the x-axis for laterally slidably supporting a lateral slider 144 thereon.

The lateral slider base 142 also includes a driving device 150 such as a servo coupled to the lateral slider 144 via a pulley-belt system 152 for moving the lateral slider 144 and components thereon along the x-axis during a manufacturing cycle.

The lateral slider 144 includes a lateral sliding element (not shown) for laterally slidably engaging the rails 148 of the lateral slider base 142. Similar to the lateral slider base 142, the lateral slider 144 also includes a pair of parallel rails 156 longitudinally extending along the y-axis for longitudinally slidably supporting a column 146 thereon. A driving device (not shown), such as a servo coupled to the column 146 and a pulley-belt system 158 or the like, is used for moving the column 146 and components on the lateral slider 144 along the y-axis during a manufacturing cycle.

The column 146 includes a longitudinal sliding element (not shown) for longitudinally slidably engaging the rails 156 of the lateral slider 144, a pair of pneumatic cylinders 162, and a C-frame 134 vertically movably mounted on a C-frame-mounting surface 166 thereof facing the workplace 106 and the front entrance 116. The C-frame 134 includes an electro-mechanical press 136 mounted onto an upper arm 172 thereof and a press plate 174 mounted onto a lower arm 176 thereof. Electro-mechanical press 136 may be, for example, a machine press. The pneumatic cylinders 162 is configured for vertically sliding the C-frame 134 along the z-axis to engage the press plate 174 with a pallet 124 positioned onto the workplace 106 (not shown in FIGS. 4 and 5). Those skilled in the art will appreciate that in some alternative embodiments, the column 146 may not include the pneumatic cylinders 162. Rather, a drive such as a servo may be used for vertically moving the C-frame 134 along the z-axis. C-frame-mounting surface 166 may include a moveable base to support the electro-mechanical press 136. The actuation path of the electro-mechanical press 136 lies along a path directly between upper arm 172 and press plate 174, although a person of skill in the art will appreciate that a change in the position and/or the orientation of electro-mechanical press 136 would change the position and orientation of the actuation path of electro-mechanical press 136.

When assembling the sliding structure 132, one may first slide the lateral slider 144 onto the lateral slider base 142, and then slide the column 146 onto the lateral slider 144.

By controlling the servos and the pneumatic cylinders 162 of the lateral slider base 142, the lateral slider 144, and the column 146, the manufacturing component 108 is therefore movable within the 3D manufacturing area 104 along the x, y, and z axes. Subsequently, while the workpiece 184 is on pallet 124 (and in the workplace 106) and is stationary, the tools of the manufacturing component 108 are movable within the 3D manufacturing area 104 in relation to the workplace 106 about the workpiece 184 thereon for accurate positioning and/or for multiple operations during a manufacturing cycle. For example, manufacturing component 108 may be moved to an operating position within workplace 106 to complete an automated operation on the workpiece 184. Compared to conventional systems that use a conveyor to move the pallet and workpiece 184 thereon towards the tool, the manufacturing system 100 disclosed herein is intended to reduce the tolerance stack between the tools and the workpiece 184, thereby giving rise to improved positioning precision.

An advantage is that the manufacturing component 108, e.g. press 136, may be moved completely away from a part so that new fixtures/tooling can be introduced on, for example, the press plates. For example, manufacturing component 108 may be moved to a standby position away from the part as needed, for example, to complete separate operations on a part such as diagnostic testing, manual assembly, and/or the like.

As the manufacturing component 108 (press 136) is supported by the ground or the base structure 112 of the cell framework 102 via the C-frame 134 and the multiple-axis sliding structure 132, the manufacturing component 108 may be capable of providing an enhanced press force. C-frame 134 may support press 136 by transmitting equal and opposite force back into the workpiece 184 via press plate 174 and therefore manufacturing component 108 may be capable of providing an enhanced press force. For example, in some embodiments, the manufacturing component 108 may provide a maximum press force greater than 12 kN (12,000 Newtons). In some embodiments, the manufacturing system 100 may provide a maximum press force of about 65 kN.

In comparison, conventional manufacturing systems may only be able to provide a maximum press force of lower than 12 kN through rails and may have about 50 μm deflection. Moreover, conventional manufacturing systems may require the workpiece 184 to exit the manufacturing system for any pressing work.

The manufacturing component 108 supports a variety of tools such as the press 136 and quick-exchange tools 138 such as gaging tools, rundown tools, pick-and-placing tools, and the like, and may have a plurality of tools installed thereon for use. In these embodiments, the press 136 may be a rotatable press such as a Rotational Electro-Mechanical Assembly Press (REMAP) offered by Promess Incorporated of Brighton, Mich., U.S.A., which may be used for pressing and for driving quick-exchange tools 138.

Figure 7:
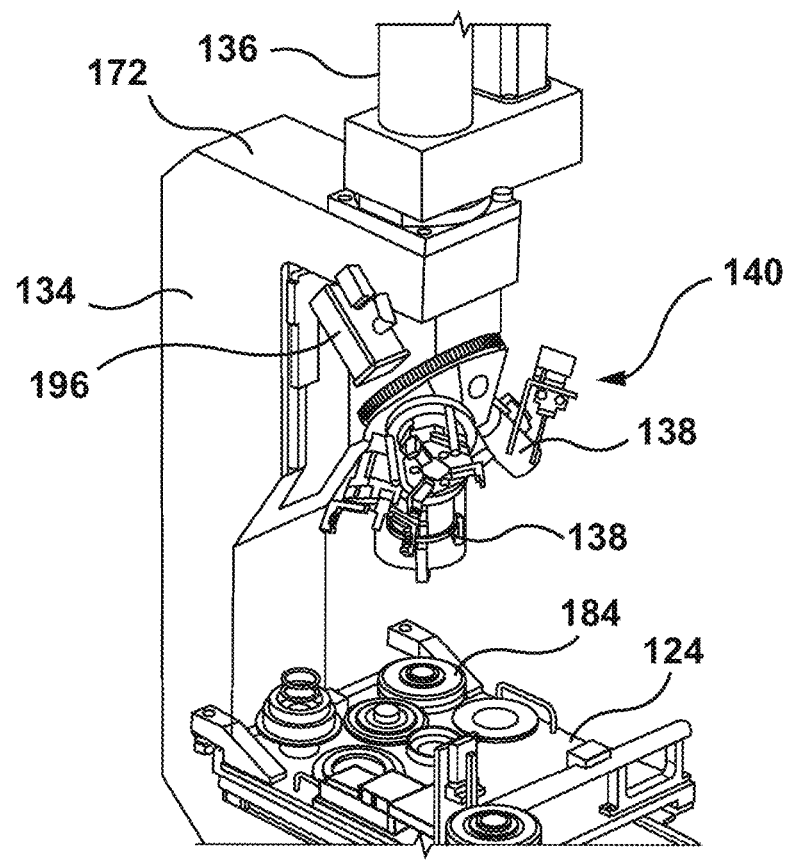
Figure 8:
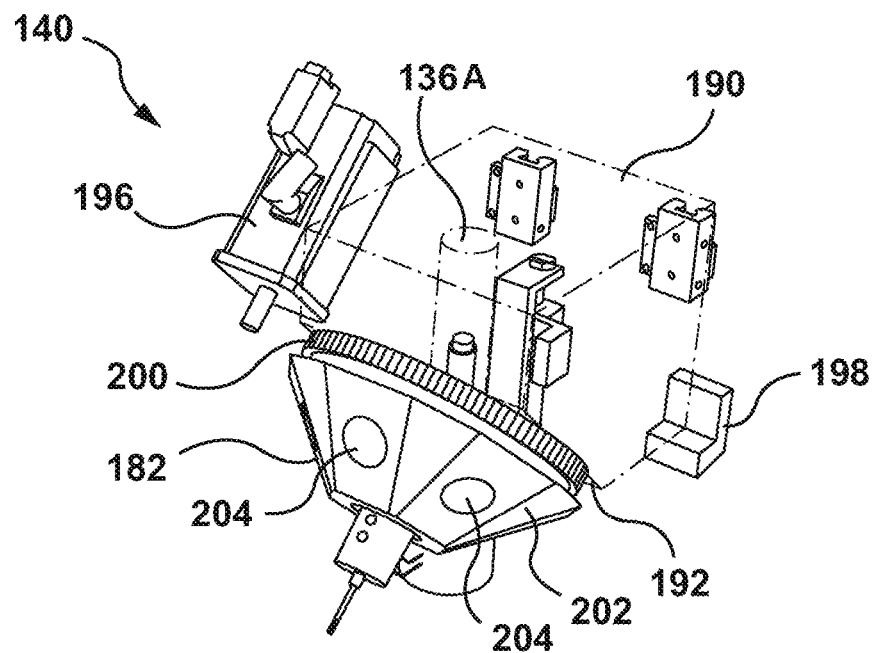
FIGS. 8 and 9 are perspective views of the tool exchanger shown in FIG. 6.
Figure 9:
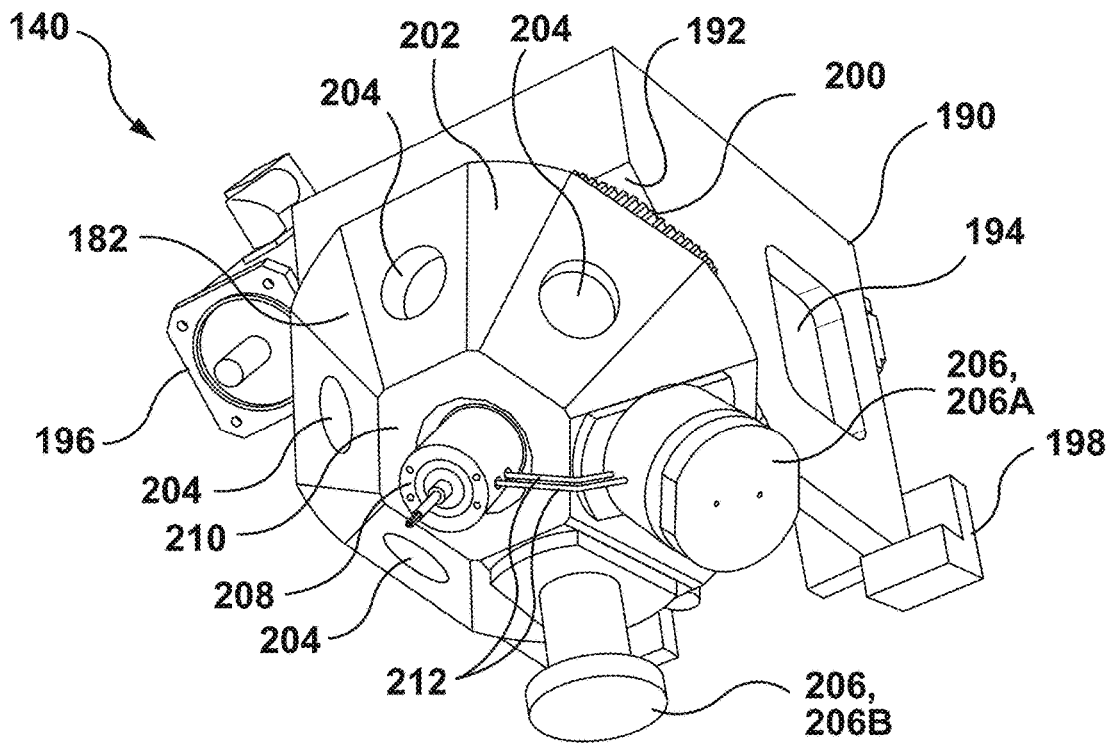
Figure 10:
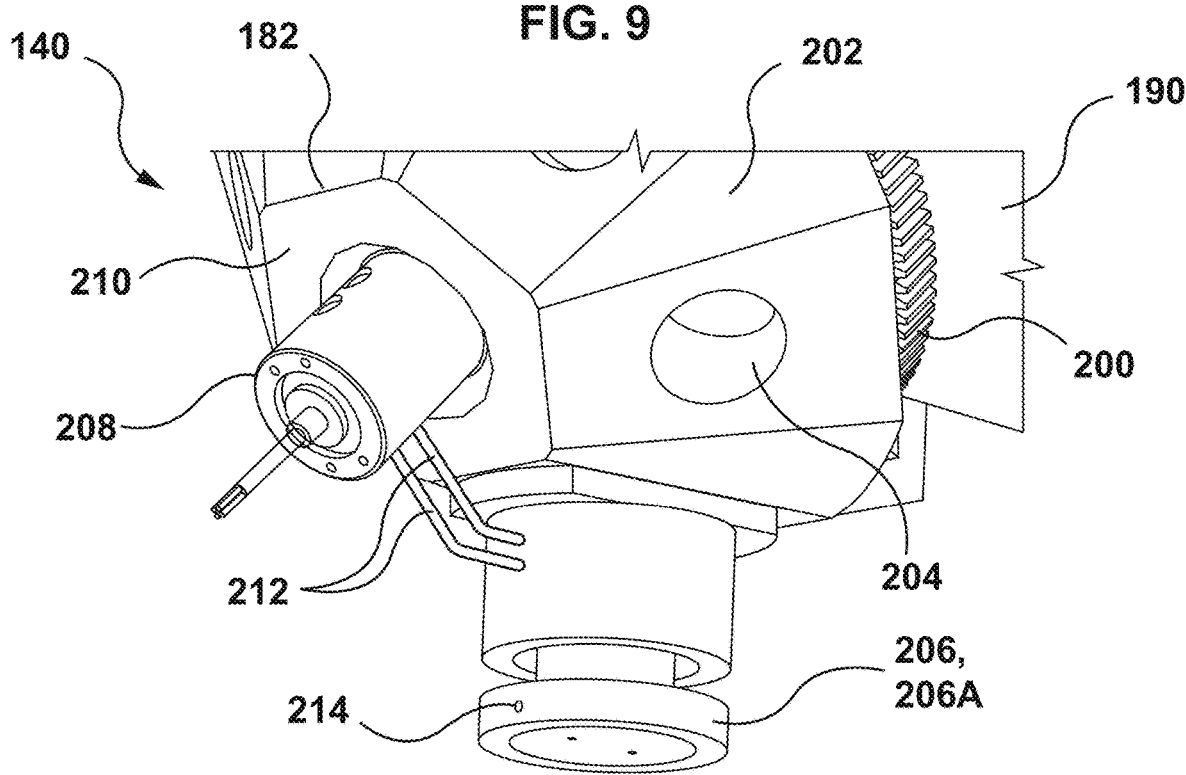
FIG. 10 is a perspective view of a turret of the tool exchanger shown in FIG. 6.
Figure 11:
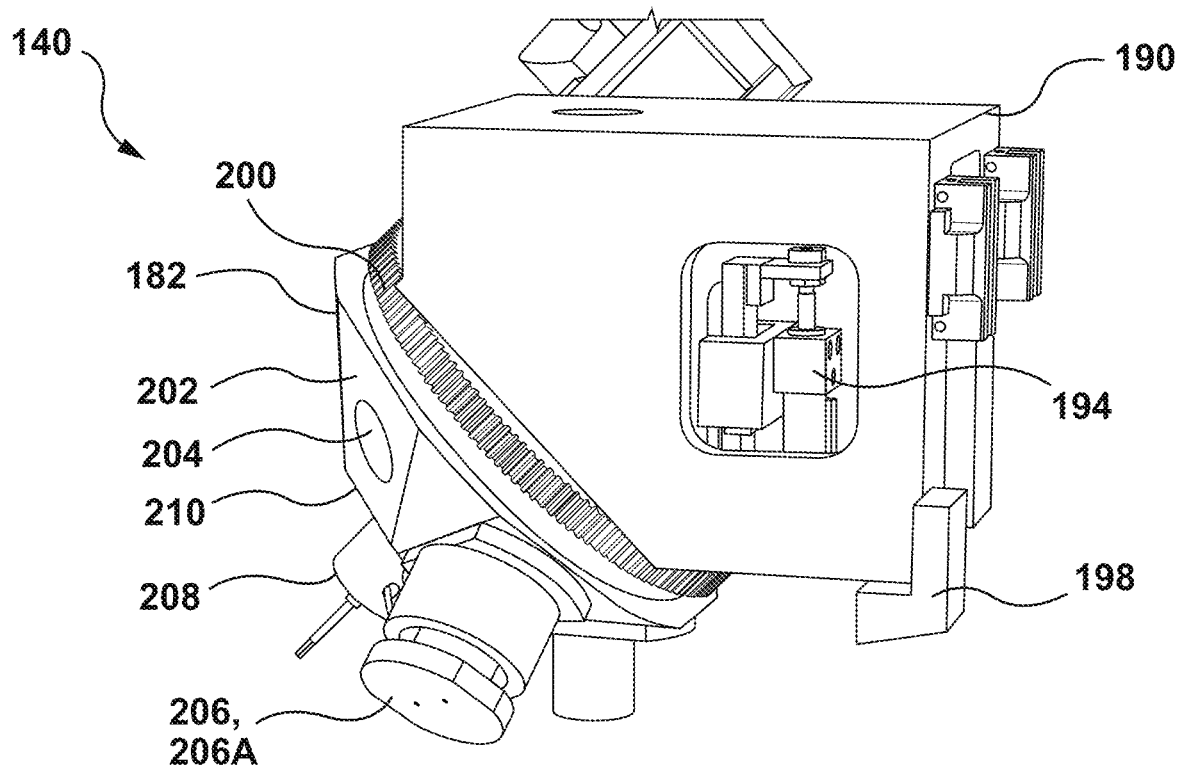
FIG. 11 is a perspective view of the tool exchanger shown in FIG. 6 showing a sidewall of a tool-exchanger housing having a service access.

As shown in FIGS. 6 and 7, in some embodiments, a tool exchanger 140 may be coupled to a bottom surface of the upper arm 172 of the C-frame 134. The tool exchanger 140 may include a rotatable turret 182, which demountably receives thereon the quick-exchange tools 138, such that one of the quick-exchange tools 138 may be selected or indexed by rotating the turret 182 and then by lowering the press 136, which contacts a press arm 136A (or similar), the selected tool 128 may be applied to a workpiece 184 on the pallet 124 for operating on the workpiece 184 during a manufacturing cycle.

As shown in FIGS. 8 to 11, the tool exchanger 140 includes a tool-exchanger housing 190 coupled to the bottom surface of the upper arm 172 and rotatably receiving therein the lower end of the press arm 136A. The tool-exchanger housing 190 includes a front surface 192 facing downwardly and forwardly and a service access 194 on a sidewall thereof. A servo 196 is mounted on the tool-exchanger housing 190 for tool indexing (described later), and a stopper 198 is mounted about a rear end of the tool-exchanger housing 190 for locking the position of the tool exchanger 140.

The turret 182 is coupled to a gear 200 and the combination thereof is rotatably coupled to the front surface 192 of the tool-exchanger housing 190. The gear 200 engages the tool-indexing servo 196 via a gear system (not shown) for rotating the turret 182 to select a tool thereon. Of course, those skilled in the art will appreciate that in some alternative embodiments, the turret 182 may be rotated by the servo 196 via an endless belt or other drive system and tool exchanger 140 does not include the gear 200.

The turret 182 is in a frustum shape with a sidewall 202 tapering from a proximal end coupled to the gear 200 to a distal end thereof. The sidewall 202 of the turret 182 includes a plurality of tool-mounting structures 204 (for example six tool-mounting structures 204 in FIGS. 8 to 11) in the form of a plurality of mounting recesses for demountably mounting one or more tool-couplings 206 for attaching quick-exchange tools 138. The one or more tool-couplings 206 may be one or more rotary tool-couplings 206A rotatable with respect to the turret 182 for attaching rotary tools and/or one or more non-rotary tool-couplings 206B for attaching non-rotary tools. The turret 182 also includes a rotary manifold 208 extending outwardly through a distal-end wall 210 and comprising a rotary manifold coupled to the rotary tool-couplings 206A via a pair of pneumatic control tubes 212 for pneumatic control. In these embodiments, the rotary tool-coupling 206A is pneumatically driven, and therefore includes a control-pneumatics outlet 214. For example, the rotary tool-coupling 206A shown in FIG. 10 includes a flange at a distal end thereof, and the control-pneumatics outlet 214 thereof is located on a sidewall of the flange.

Those skilled in the art will appreciate that in some embodiments, at least one of the rotary tool-couplings 206A may be driven by an electrical drive for rotation.

Figure 12:
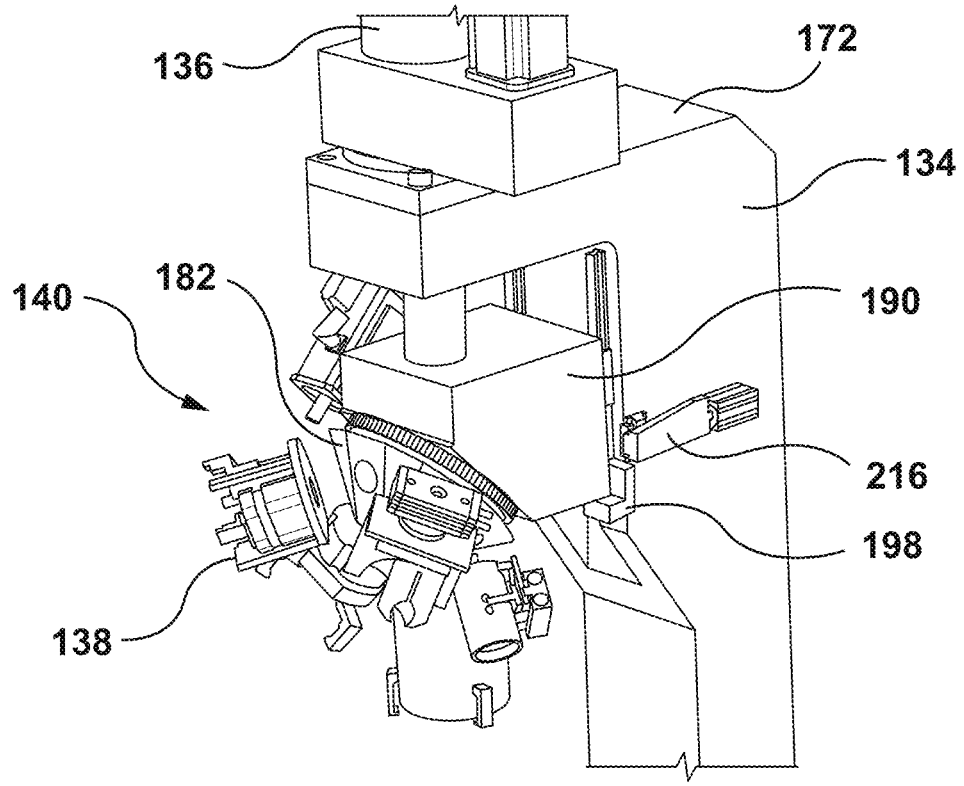
FIGS. 12 and 13 are perspective views of the tool exchanger shown in FIG. 6 for showing the tool exchanger switching between an operation mode (FIG. 12) and an indexing mode (FIG. 13)
Figure 13:
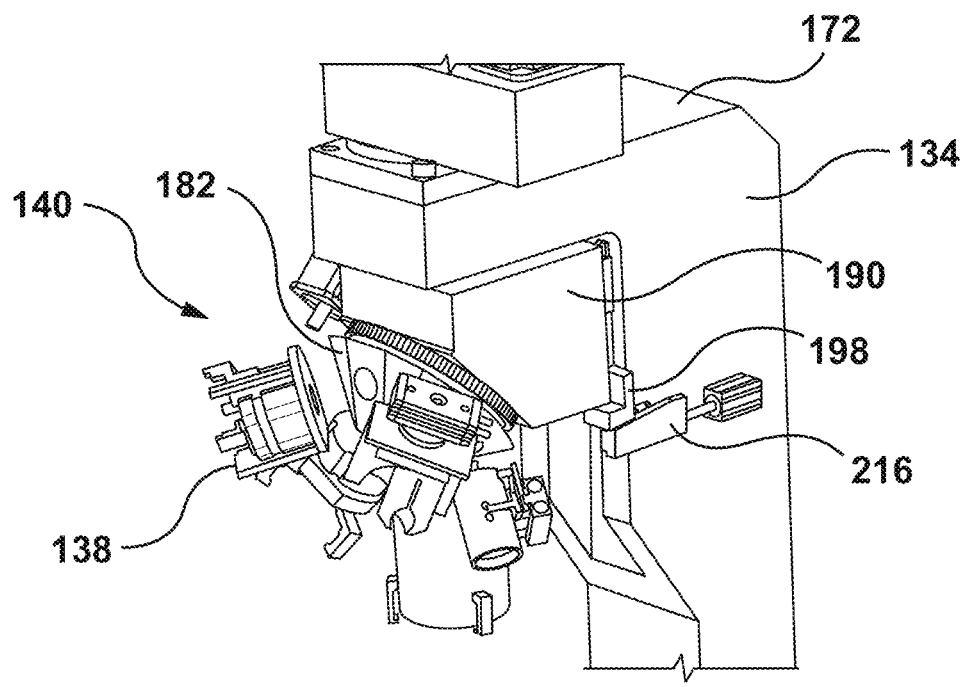

The tool exchanger 140 may be configured in an operation mode wherein the tools 138 attached thereon may be in operation for manufacturing or an indexing mode wherein the tool exchanger 140 may be automatically or manually rotated to select a tool 138. As shown in FIGS. 12 and 13, the C-frame 134 includes a horizontally-retractable latch 216 for acting with the stopper 198 of the tool exchanger 140 to configure the tool exchanger 140 into the operation or indexing mode.

As shown in FIG. 12 wherein the tool exchanger 140 is in the operation mode, the latch 216 is retracted from the stopper 198 and the tool exchanger 140 may be vertically moved by the press 136. As will be described in more detail later, when the tool exchanger 140 is in the operation mode, the press 136 engages a selected tool 138 to drive the tool 138 to operate.

As shown in FIG. 13, to configure the tool exchanger 140 into the indexing mode, the press 136 pulls the tool exchanger 140 to its uppermost position and then the latch 216 is horizontally fully extended such that the stopper 198 seats against the latch 216 to lock the tool exchanger 140 in position for indexing. As will be described in more detail later, when the tool exchanger 140 is in the indexing mode, the press 136 may disengage the tools 138 to allow the tool exchanger 140 to select another tool for operation.

Figure 14:
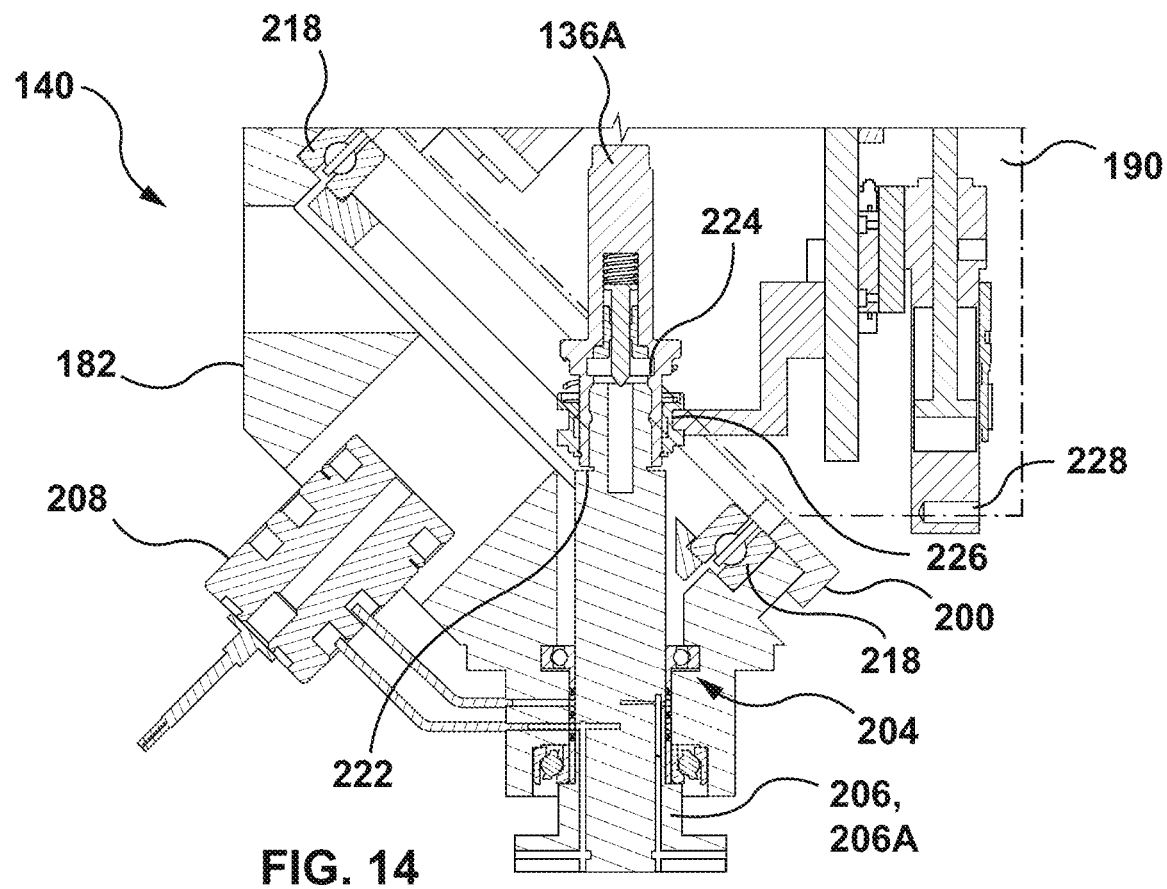
FIG. 14 is a cross-sectional view of the tool exchanger shown in FIG. 6 wherein the tool exchanger is in the operation mode and the press engages a rotary tool.

FIG. 14 is a cross-sectional view of the tool exchanger 140 in the operation mode showing the press arm 136A engaging a rotary tool-coupling 206A. In other words, press arm 136A has been moved along the actuation path of press 136 by press 136 to a first position that couples press arm 136A to rotary tool-coupling 206A. As shown, the gear 200 is rotatably coupled to the tool-exchanger housing 190 via bearing 218, for example, a Type-X Reali-Slim® sealed bearing or the like (Reali-Slim and Kaydon are registered trademarks of Kaydon® Bearings of Muskegon, Mich., USA). A rotary tool-coupling 206A extends through a mounting recess 204 into the turret 182 and may rotate therein. The rotary tool-coupling 206A includes a circumferential shoulder 222.

As described above, the press arm 136A extends into the tool-exchanger housing 190. The press arm 136A includes a press-and-rotate coupling 224 at the lower end thereof which seats on the circumferential shoulder 222 of the rotary tool-coupling 206A and is releasably fastened to the rotary tool-coupling 206A by a connect/disconnect mechanism 226 controllable by, for example, a release handle 228 such that the rotary tool-coupling 206A and the tool attached thereon (not shown) may be rotated and upwardly/downwardly moved by the press arm 136A, which is moved by the press 136. Moreover, when the press arm 136A engages the rotary tool-coupling 206A and the tool attached thereon, the press forces of the press arm 136A are transmitted to the attached tool without being applied to the tool exchanger 140.

Figure 15:
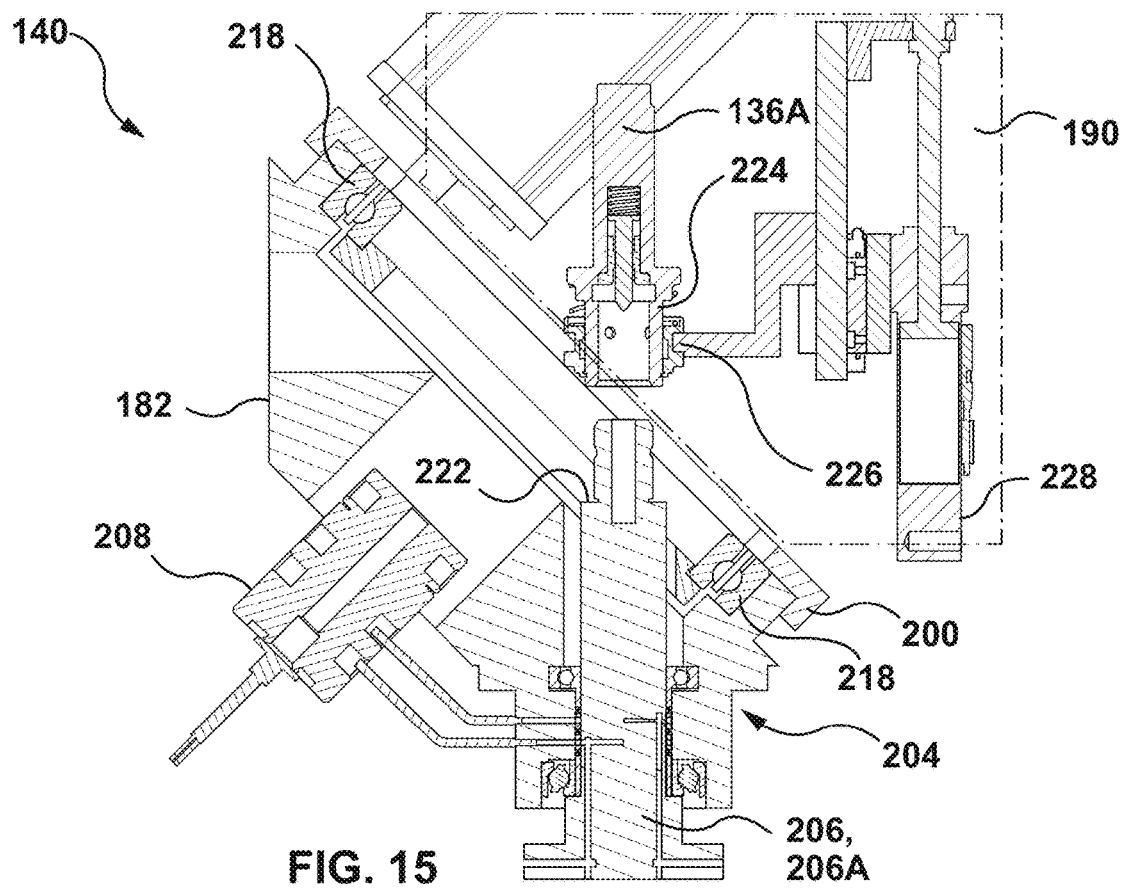
FIGS. 15 and 16 are a cross-sectional view and a perspective view of the tool exchanger shown in FIG. 6, respectively, wherein the tool exchanger is in the indexing mode and the press disengages the rotary tool.
Figure 16:
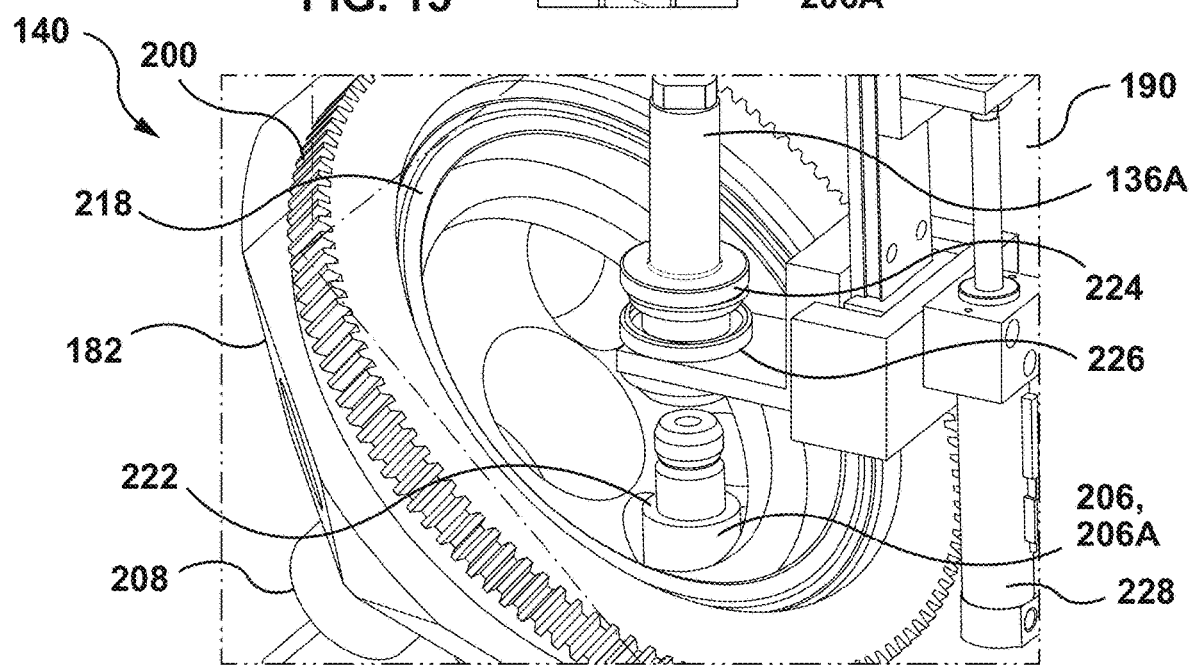

FIGS. 15 and 16 are cross-sectional and schematic perspective views, respectively, of the tool exchanger 140 in the indexing mode, showing the press arm 136A disengaging a rotary tool-coupling 206A. In other words, press arm 136A has been moved along the actuation path of press arm 136A to a second position that decouples press arm 136A from rotary tool-coupling 206A. As shown, an operator (not shown) may press the release handle 228 which then controls the connect/disconnect mechanism 226 to release the press-and-rotate coupling 224 from the rotary tool-coupling 206A. The press arm 136A may then move upward and disengage the rotary tool-coupling 206A.

Figure 17:
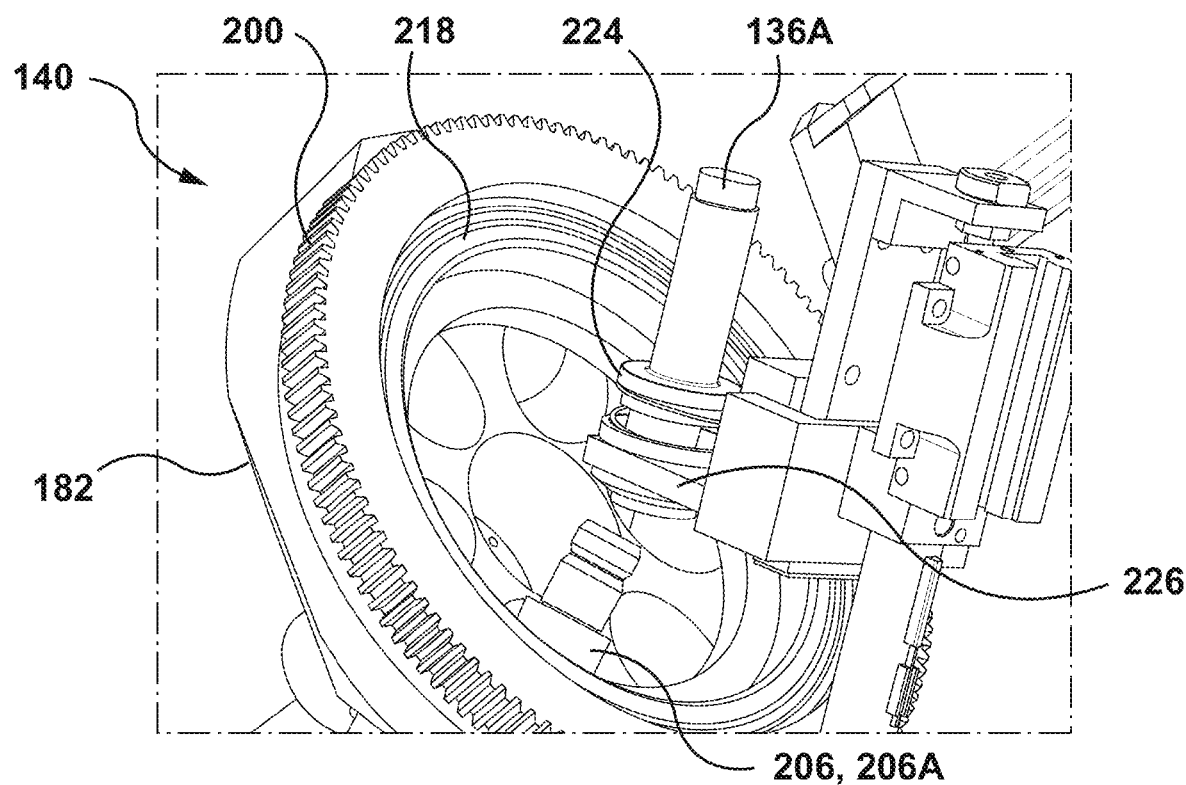
FIG. 17 is a perspective view of the tool exchanger shown in FIG. 6 wherein the turret is rotated for selecting a tool.

As shown in FIG. 17, after the press arm 136A is disengaged from the rotary tool-coupling 206A, the turret 182 may be rotated to align another tool-coupling 206 with the press arm 136A. Then, the press arm 136A moves downward to extend the press-and-rotate coupling 224 thereof onto the circumferential shoulder 222 of the tool-coupling 206 thereunder and the connect/disconnect mechanism 226 fastens the press-and-rotate coupling 224 with the circumferential shoulder 222 to complete the engagement of the press arm 136A with the tool-coupling 206.

Figure 18:
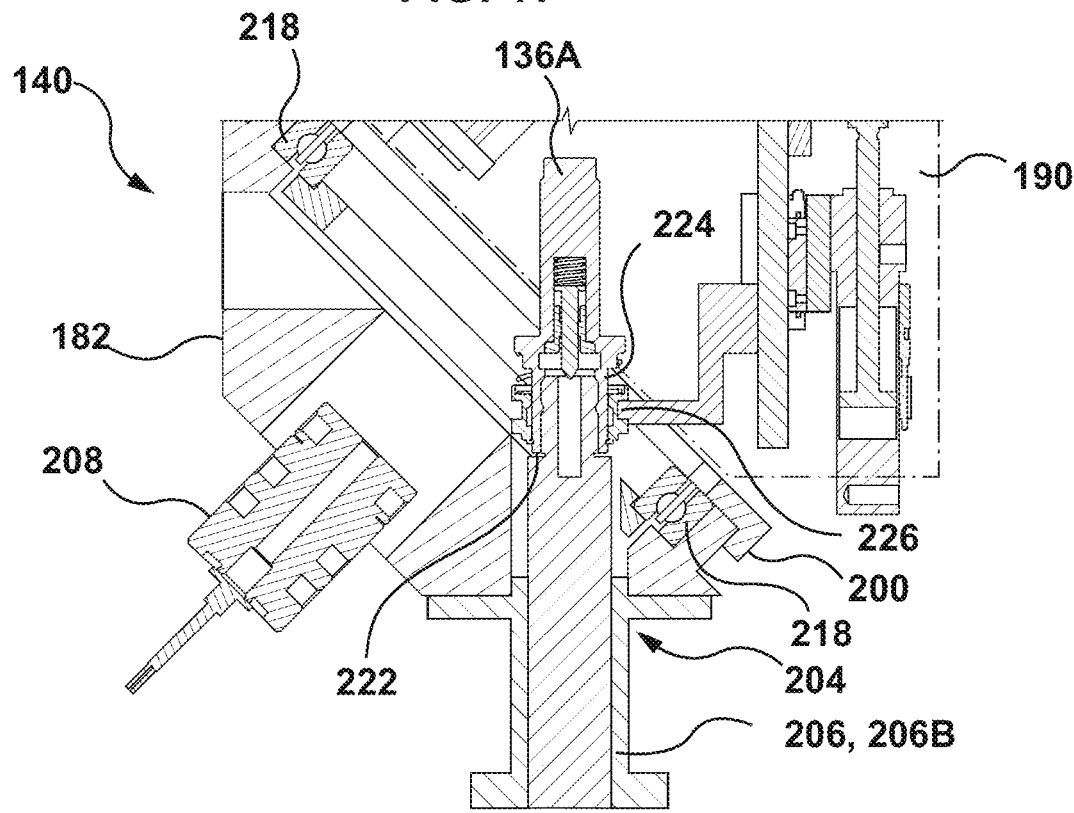
FIG. 18 is a cross-sectional view of the tool exchanger shown in FIG. 6 wherein the tool exchanger is in the operation mode and the press engages a non-rotary tool.

FIG. 18 is a cross-sectional view of the tool exchanger 140 in operation mode, showing the press arm 136A engaging a non-rotary tool-coupling 206B. The non-rotary tool-coupling 206B engages the press arm 136A in a similar manner as described above except that the tool-coupling 206B and the tool attached therein are not rotatable.

The turret 182 may be indexable, where an indexable turret includes a turret that may be rotated between a plurality of fixed rotary positions, wherein each fixed rotary position aligns a respective one of the one or more tool-couplings with the press arm 136A. An indexable turret may be advantageous since a desired tool may be aligned with the press arm 136A quickly and reliably by selecting the corresponding fixed position, rather than continuously monitoring the position of the tool as the turret 182 rotates and then halting rotation of the turret 182 when alignment is achieved.

The manufacturing system 100 disclosed herein has an advantage of quick installation and setup. For example, one may set up the manufacturing system 100 by:
i. (installing the frame 114 onto the base structure 112 to assemble the cell framework 102;
ii. mounting the workplace 106 in the cell framework 102;
iii. coupling the lateral slider base 142 onto the base structure 112;
iv. sliding the lateral slider 144 onto the lateral slider base 142;
v. sliding the column 146 onto the lateral slider 144; and
vi. installing other components such as the doors 118, control terminal 120, and the like, as needed.

The manufacturing system 100 disclosed herein is suitable for manufacturing workpieces 184 of a same type or workpieces 184 of multiple types. The manufacturing system 100 disclosed herein is also suitable for manufacturing with a single operation or manufacturing with multiple operations.

The manufacturing system 100 disclosed herein allows access to the workpieces 184 in the workplace 106 from various angles which provides manufacturing flexibility compared to conventional manufacturing systems that may only allow vertical access to the workpieces 184. Moreover, the manufacturing system 100 disclosed herein uses high-speed axis drives which are intended to provide maximum processing speed.

The manufacturing system 100 disclosed herein allows quick change tooling. Moreover, the manufacturing system 100 disclosed herein supports multiple in-station processes and supports common processes on different workpieces 184. Therefore, compared to using conventional manufacturing systems, one may use fewer manufacturing systems 100 to maintain a similar manufacturing rate.

In some embodiments, the manufacturing system 100 may be set up for automatic manufacturing without operator's intervention. In some cases, the manufacturing system 100 may not need any front doors 118 or other elements related to manual access or control.

In some embodiments, at least one of the lateral slider base 142 and the lateral slider 144 may use a rack-and-pinion drive for sliding the components thereon.

Figure 19:
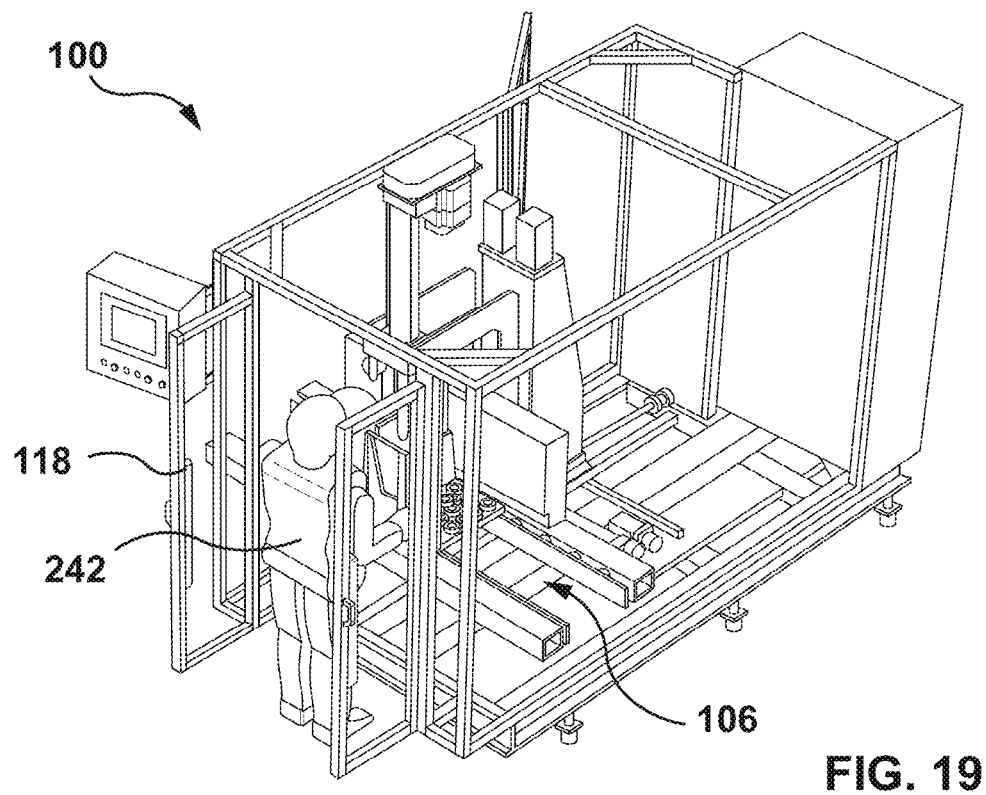
FIG. 19 is a perspective view of a manufacturing system configured for semi-automatic manufacturing, according to some embodiments of this disclosure.

In some embodiments as illustrated in FIG. 19, the manufacturing system 100 may be set up for semi-automatic manufacturing. In these embodiments, an operator 242 may open the front doors 118 and manually perform operations on workpieces 184 in the workplace 106 and/or otherwise take part in the manufacturing process. The workplace 106 may include an additional workplace accessible to the operator outside cell framework 102. The additional workplace may include a fixture moveable via a transfer receptacle between the workplace 106 and the additional workplace. The transfer receptacle may include a conveyer belt, rails, a pallet mounted on a conveyer belt and/or rails, or the like.

Figure 20:
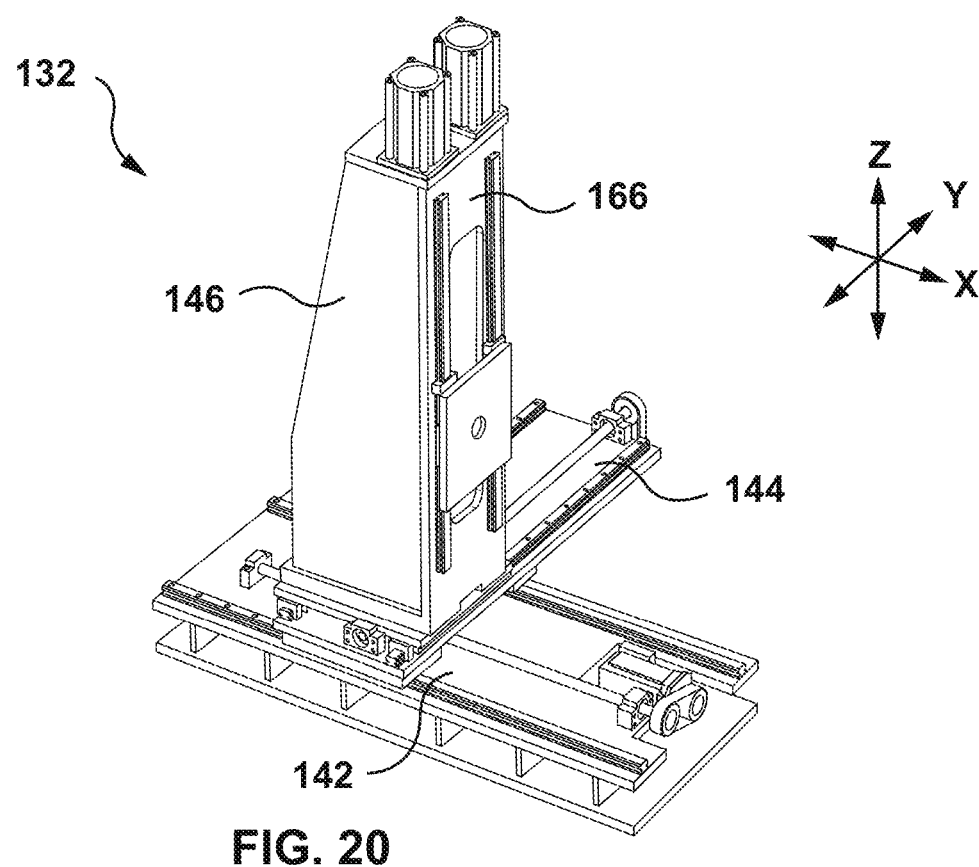
FIG. 20 is a perspective view of the sliding structure according to some embodiments of this disclosure, wherein a C-frame-mounting surface of the sliding structure faces a lateral side.

In some embodiments, the workplace 106 is located adjacent the front end of the manufacturing area 104 near the front entrance 116, and the C-frame-mounting surface 166 of the column 146 faces the front entrance 116. In some alternative embodiments, the workplace 106 may be located at a lateral side of the manufacturing area 104. As illustrated in FIG. 20, the column 146 may be "side-mounted" to the lateral slider 144 such that the front entrance 116 thereof faces a lateral side.

Figure 21:
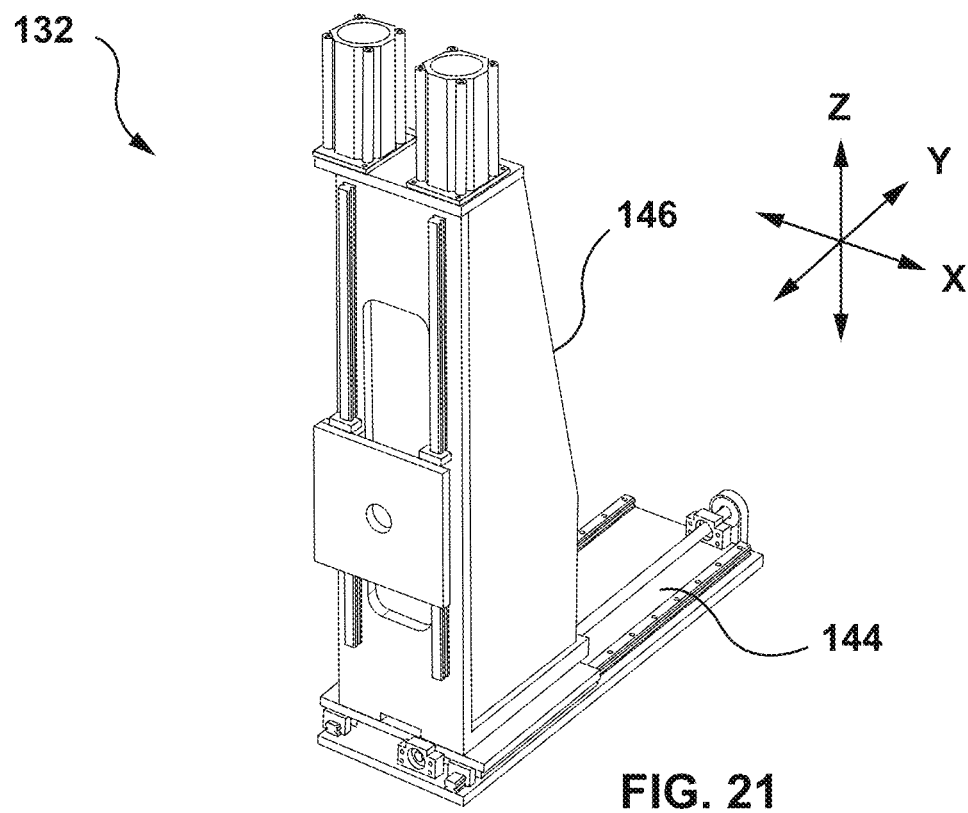
FIG. 21 is a perspective view of the sliding structure according to some embodiments of this disclosure, wherein the sliding structure is movable along the y and z axes.

As illustrated in FIG. 21, in some embodiments, the multiple-axis sliding structure 132 may not include any lateral slider, and the column 146 may be movably installed onto the lateral slider 144. In these embodiments, the multiple-axis sliding structure 132 may be movable along, for example, only the x and z axes.

In some embodiments, the multiple-axis sliding structure 132 does not include any lateral slider, and the column 146 is movably installed onto the lateral slider base 142. In these embodiments, the multiple-axis sliding structure 132 may be movable along, for example, only the y and z axes.

Figure 22:
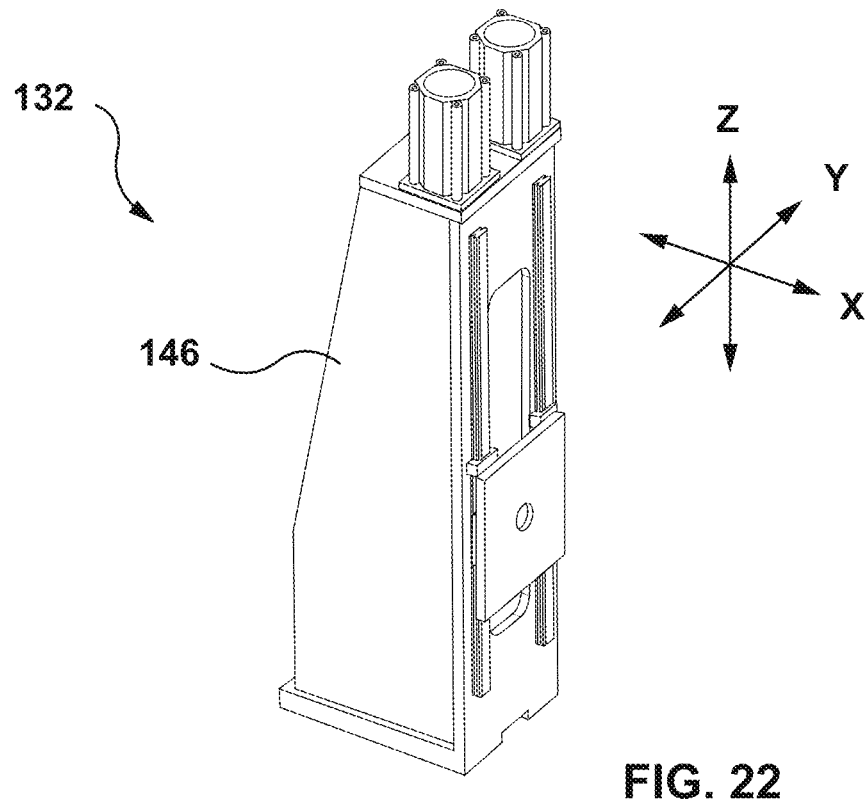
FIG. 22 is a perspective view of the sliding structure according to some embodiments of this disclosure, wherein the sliding structure is movable along the z-axis.

In some embodiments as illustrated in FIG. 22, the sliding structure 132 may only include the column 146 directly coupled to the base structure 112. In these embodiments, the sliding structure 132 becomes a single-axis sliding structure may be movable along, for example, the z-axis.

Figure 23:
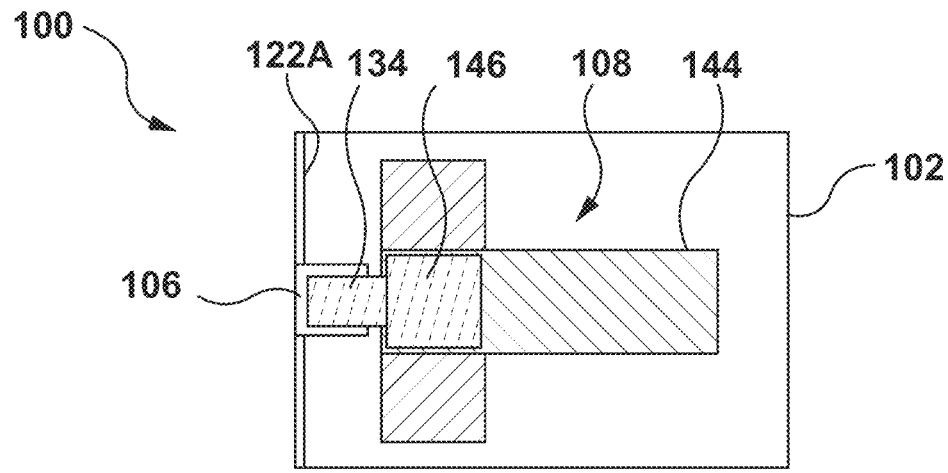
FIG. 23 is a plan view of a manufacturing system according to some embodiments of this disclosure, wherein a pallet is cantilevered on a track in the workplace.

In some embodiments as shown in FIG. 23, the manufacturing system 100 may include a conveying mechanism illustrated by one track 122A for moving the pallet 124 into the workplace 106. In these embodiments, the pallet 124 may be movably cantilevered on the track 122A.

Figure 24:
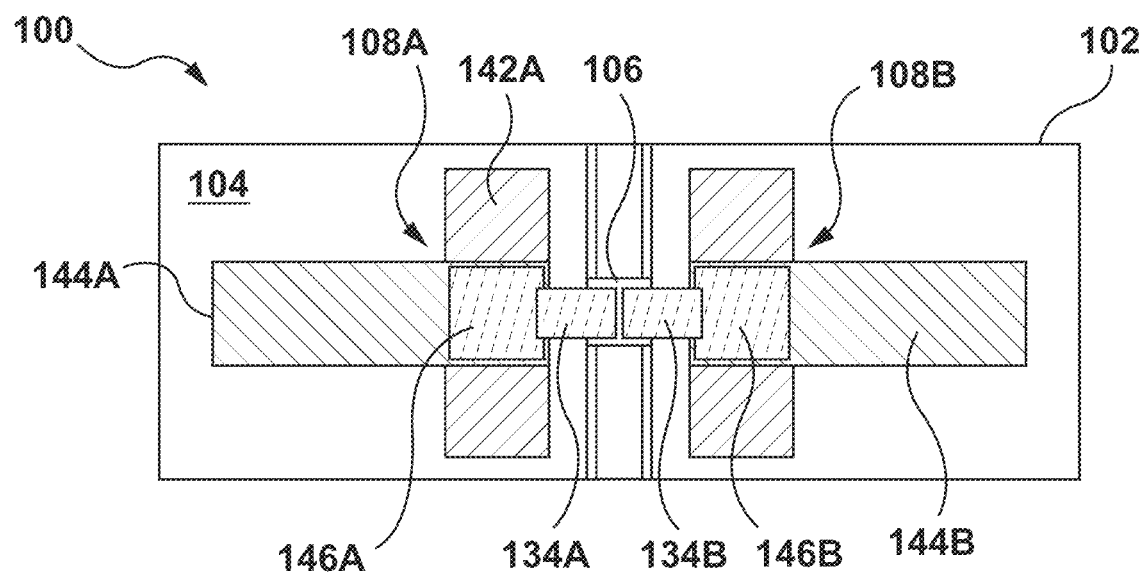
FIG. 24 is a plan view of a manufacturing system according to some embodiments of this disclosure, wherein the manufacturing system includes two manufacturing components accessible to a common workplace.
Figure 25:
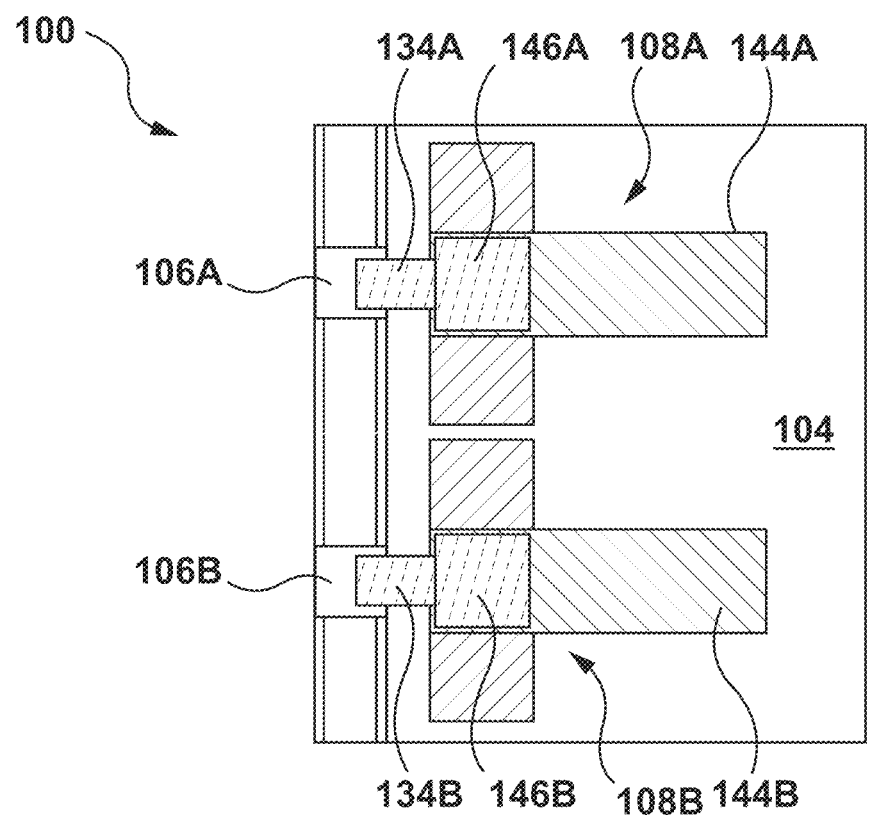
FIG. 25 is a plan view of a manufacturing system according to some embodiments of this disclosure, wherein the manufacturing system includes two manufacturing components each accessible to a respective workplace.

In some embodiments as illustrated in FIGS. 24 and 25, the manufacturing system 100 may include two or more manufacturing components 108 in a same manufacturing area 104.

In the example shown in FIG. 24, the manufacturing system 100 includes a common workplace 106 and two manufacturing components 108A and 108B about the common workplace 106 for automated manufacturing operations such that each manufacturing component 108A, 108B may operate on a respective workpiece 184 (not shown) at the common workplace 106 substantially simultaneously. Alternatively, each manufacturing component 108A, 108B may operate on a same workpiece 184 at the common workplace 106 in series.

In the example shown in FIG. 25, the manufacturing system 100 includes two workplaces 106A and 106B and two manufacturing components 108A and 108B associated with the workplaces 106A and 106B, respectively. The manufacturing system 100 also includes a conveying mechanism (not shown) for moving workpieces 184 to the workplaces 106A and 106B.

In this example, the conveying mechanism may move the two or more workpieces 184 to the workplaces 106A and 106B, and each manufacturing component 108A, 108B may operate on a workpiece 184 at the respective workplace 106A, 106B substantially simultaneously. Alternatively, the conveying mechanism may move one or more workpieces 184 to the workplace 106A for the manufacturing component 108A to operate. After the manufacturing component 108A completes its operations on the workpieces 184, the conveying mechanism then moves the workpieces 184 to the workplace 106B for the manufacturing component 108B to operate. Therefore, the manufacturing components 108A and 108B may operate on a same workpiece 184 in series.

In some embodiments, the manufacturing system 100 may include one or more first workplaces for automated manufacturing operations and one or more second workplaces for manual operations by one or more operators.

Figure 26:
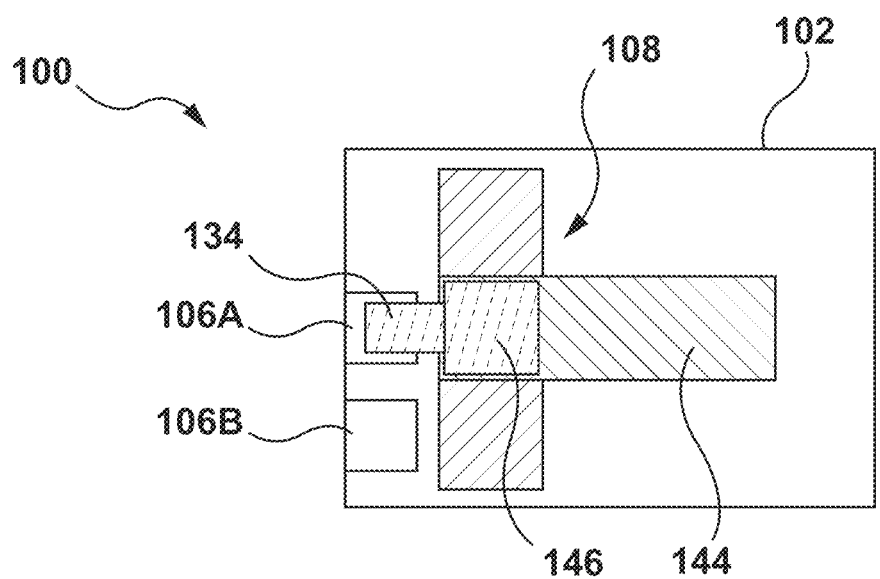
FIG. 26 is a plan view of a manufacturing system according to some embodiments of this disclosure, wherein the manufacturing system includes one manufacturing component, a first workplace accessible by the manufacturing component for automated operations, and a second workplace accessible by an operator for manual operations.

For example, in an embodiment as illustrated in FIG. 26, the manufacturing system 100 includes two workplaces 106A and 106B and a manufacturing component 108. The first workplace 106A is accessible to the manufacturing component 108 for automated operations and the second workplace 106B is accessible to an operator for manual operations. The manufacturing system 100 includes a pallet (not shown) movable between the two workplaces 106A and 106B for moving workpiece 184 therebetween.

Figure 27:
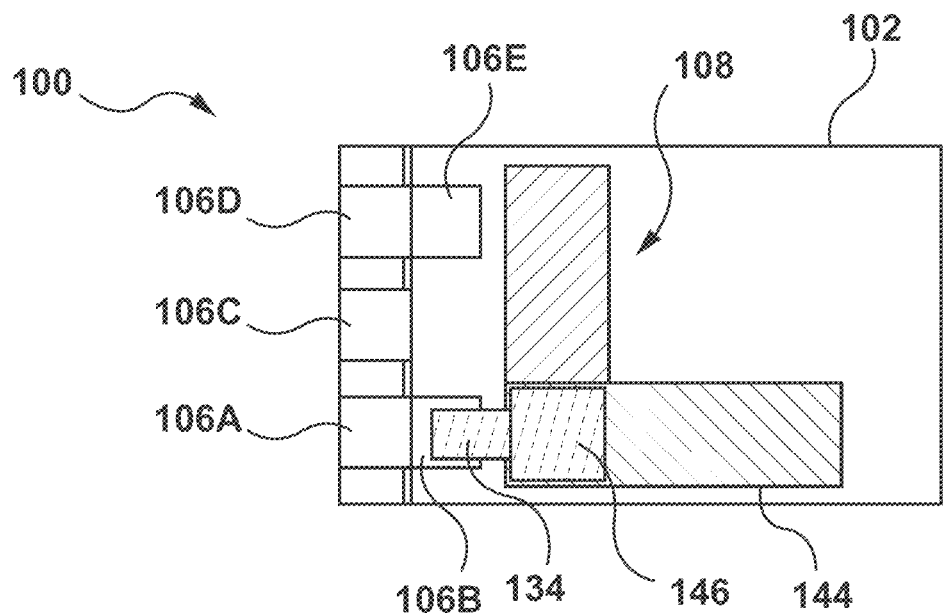
FIG. 27 is a plan view of a manufacturing system according to some embodiments of this disclosure, wherein the manufacturing system includes one manufacturing component and a plurality of workplaces, some workplaces accessible by the manufacturing component for automated operations, and some other workplaces accessible by an operator for manual operations.

In an embodiment as illustrated in FIG. 27, the manufacturing system 100 includes a plurality of workplaces 106A to 106E and a conveying mechanism (not shown) for moving one or more pallets 124 and workpiece 184 thereon between the workplaces 106A to 106E. The workplaces 106A, 106C, and 106D are accessible to an operator for manual operations, and may each include a sliding drawer or the like for moving a workpiece to the operator side. The workplaces 106B and 106E are accessible to a manufacturing component 108 for automated manufacturing operations. The manual operations and automated manufacturing operations may be conducted substantially simultaneously or serially.

Figure 28:
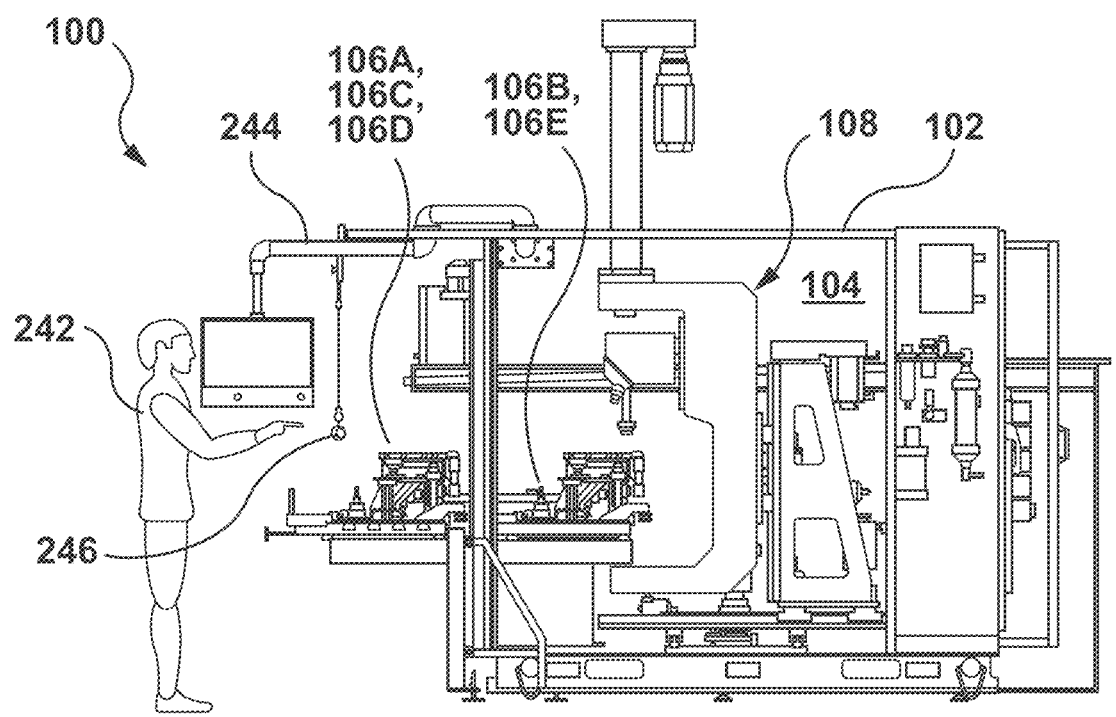
FIG. 28 is a side view of the manufacturing system shown in FIG. 27.

As illustrated in FIG. 28, the manufacturing system 100 may also include an overhead rail 244 extended forwardly from the top of the cell framework 102 for holding one or more hand tools and/or accessories and/or displays that an operator 242 may use in a manufacturing cycle.

In some embodiments, the cell framework 102 may be modularized such that the cell framework 102 and the components therein form a manufacturing module (denoted using reference numeral 100'; see FIGS. 29 to 34). In these embodiments, the manufacturing system 100 may further include one or more manufacturing modules 100' and/or other suitable modules coupled together in a modular fashion.

Figure 29:
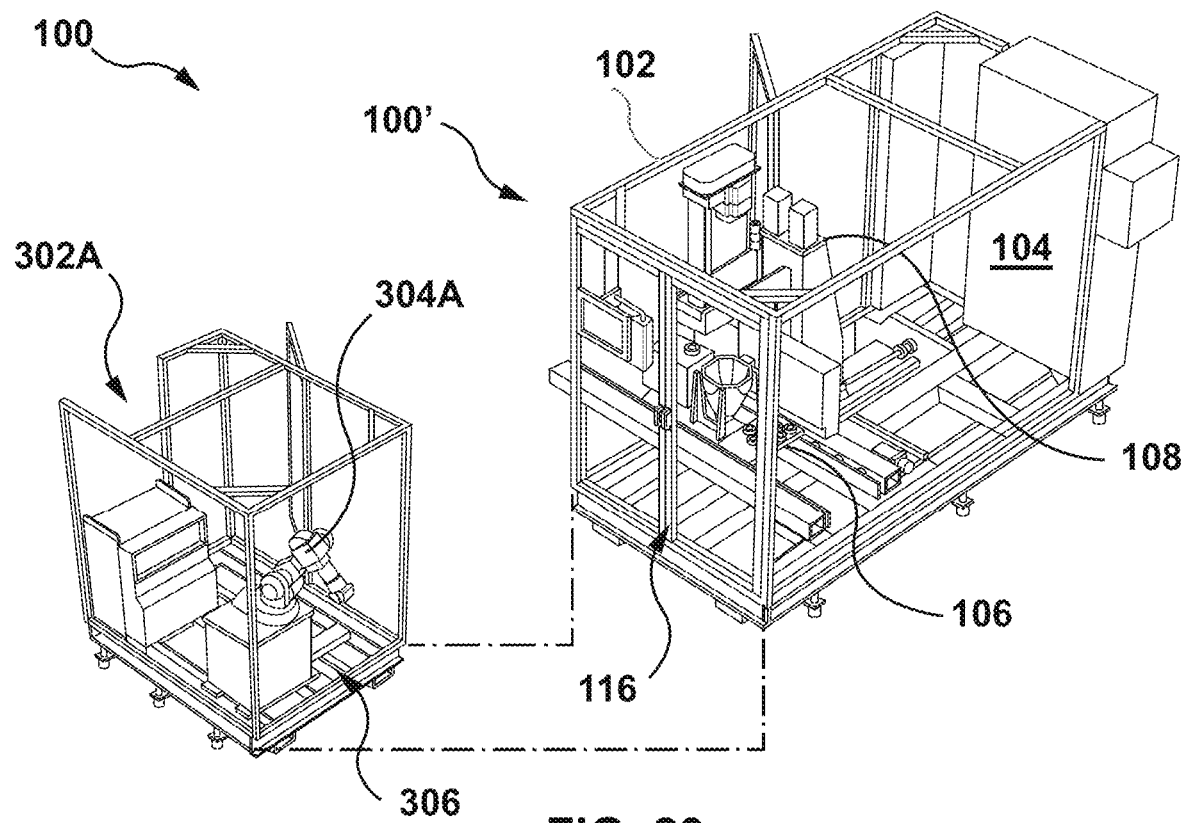
FIGS. 29 and 30 are perspective views of a manufacturing system shown in FIG. 1 acting as a manufacturing module and coupled to a robot module in a "front-to-front" manner.
Figure 30:
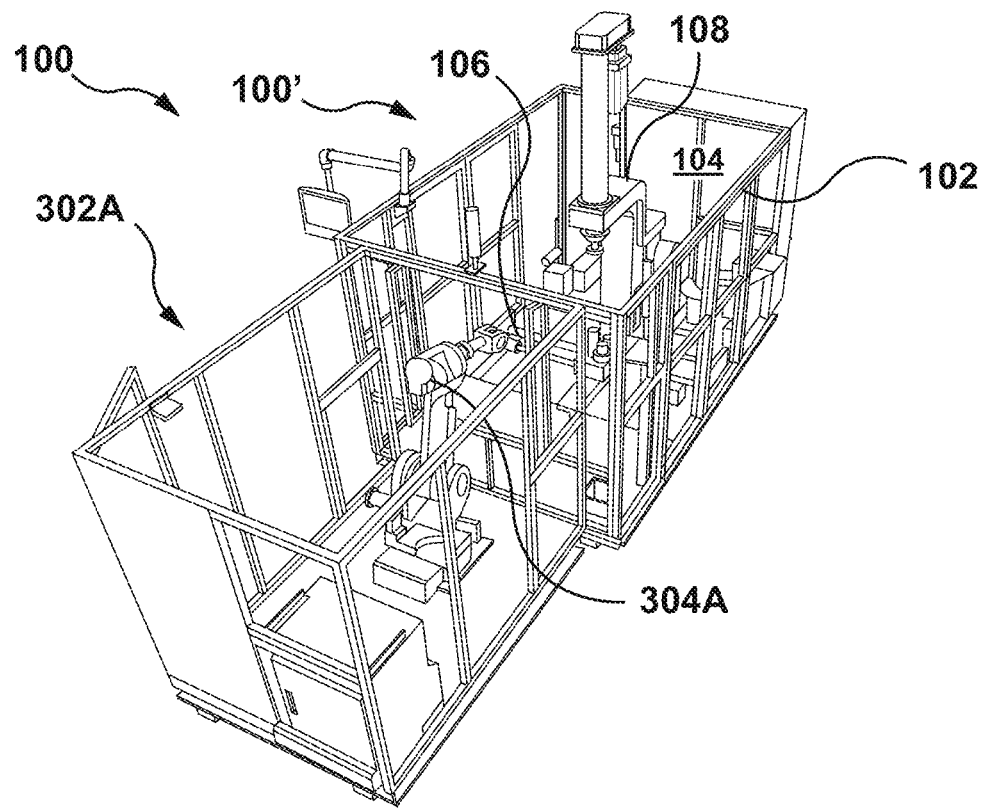

For example, in some embodiments as shown in FIG. 29, the manufacturing system 100 may include a manufacturing module 100' as described above and a front-mountable manufacturing robot module 302A having a manufacturing robot 304A. The front 306 of the front-mountable manufacturing robot module 302A is mountable to the front 116 of the manufacturing module 100'. FIG. 30 shows the manufacturing system 100 after the front-mountable manufacturing robot module 302A is coupled to the manufacturing module 100' in a "front-to-front" manner. As shown, the manufacturing robot 304A may access the workpiece in the workplace 106 for performing manufacturing operations such as, for example, Room-Temperature-Vulcanizing (RTV) silicone 3D printing, material handling, assembly assisting, and/or the like.

Figure 31:
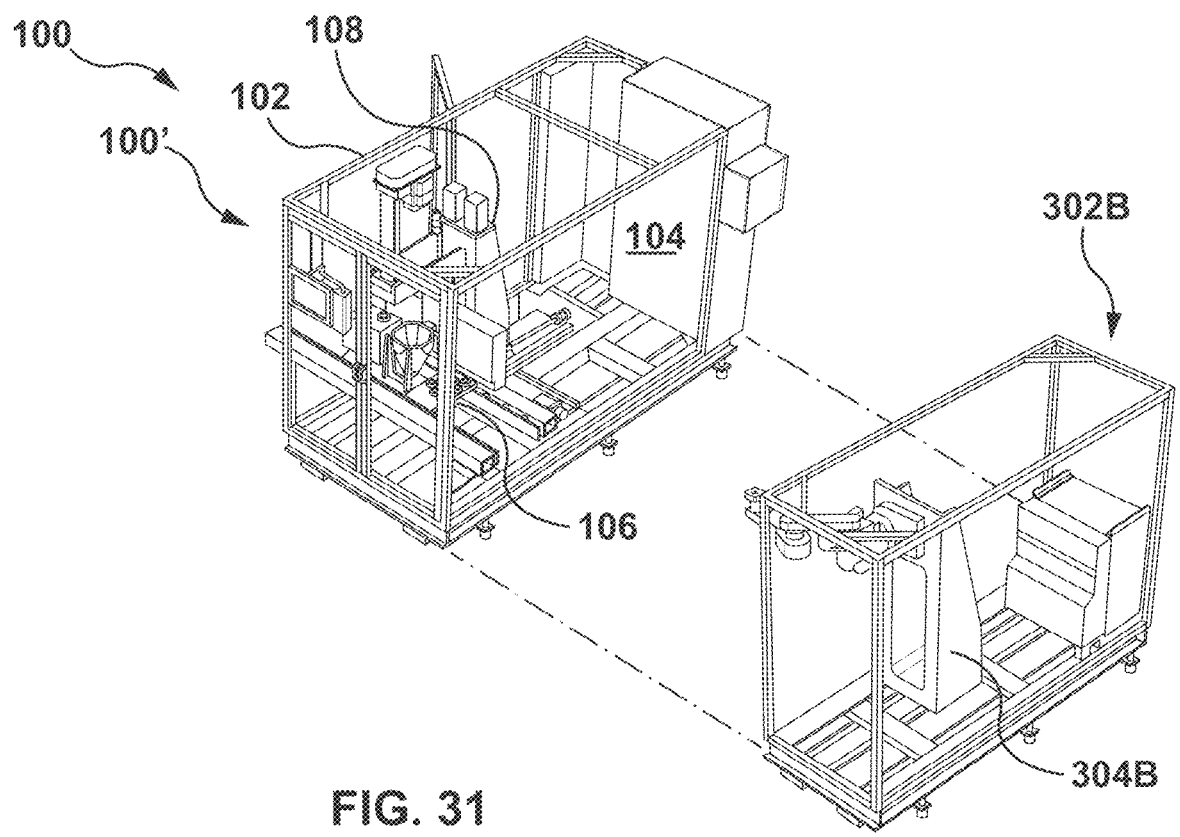
FIGS. 31 and 32 are perspective views of a manufacturing system shown in FIG. 1 acting as a manufacturing module and coupled to a robot module in a "side-by-side" manner.
Figure 32:
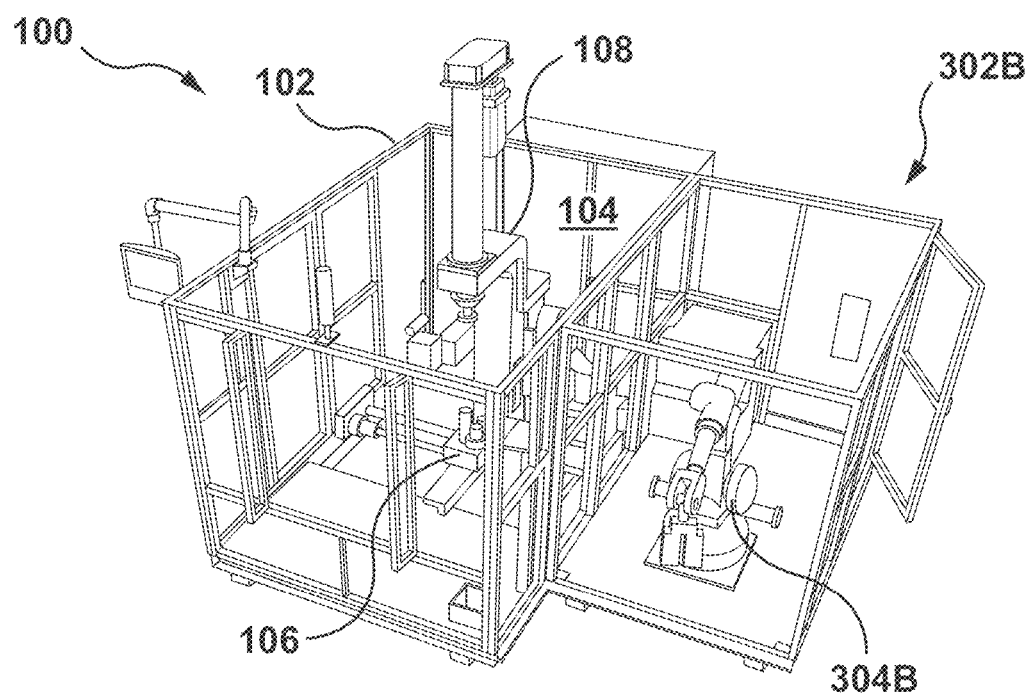

In some embodiments as shown in FIGS. 31 and 32, the manufacturing system 100 may include a manufacturing module 100' and a side-mountable manufacturing robot module 302B having a manufacturing robot 304B and mounted to a lateral side of the manufacturing module 100'. The manufacturing robot 304B may access the workpiece in the workplace 106 for performing manufacturing operations such as plasma treating, on-deck pre-work, assembly assisting, and/or the like.

Figure 33:
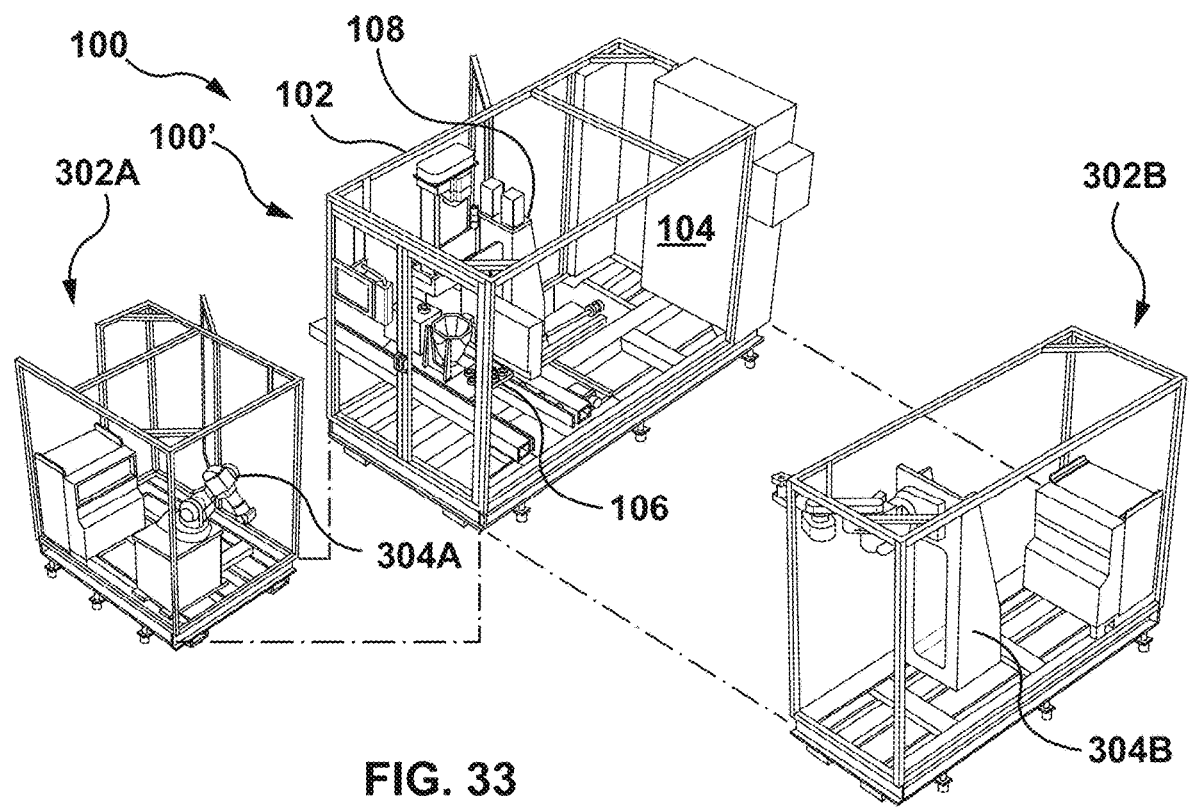
FIGS. 33 and 34 are perspective views of a manufacturing system shown in FIG. 1 acting as a manufacturing module and coupled to two robot modules.
Figure 34:
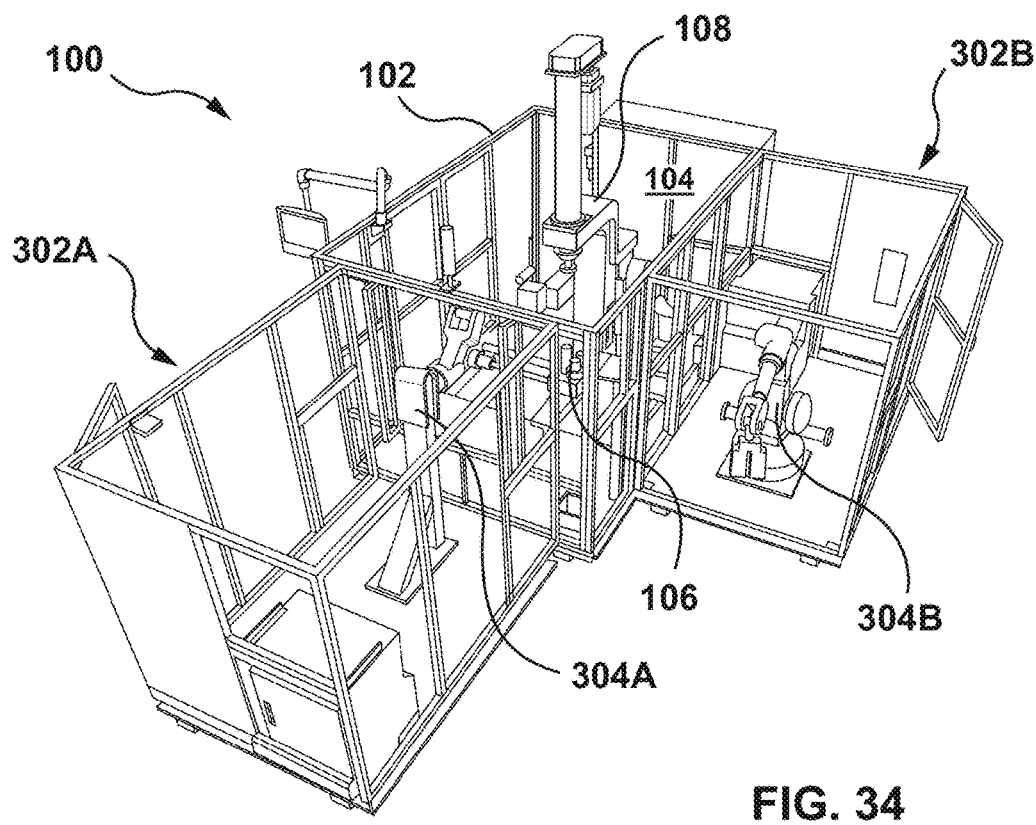

In some embodiments as shown in FIGS. 33 and 34, the manufacturing system 100 may include a manufacturing module 100', a front-mountable manufacturing robot module 302A having a manufacturing robot 304A and coupled to the front 116 of the manufacturing module 100', and a side-mountable manufacturing robot module 302B having a manufacturing robot 304B and coupled to a lateral side of the manufacturing module 100'. The manufacturing robots 304A and 304B may access the workpiece in the workplace 106 for performing manufacturing operations.

In embodiments shown in FIGS. 29 to 34, the robots can be integrated for various functions, including heavy work such as part flipping, large powerheads, and/or the like. The manufacturing system 100 is generally suitable for various loading options thereby giving rise to floor space saving. Further, the components thereof are highly interchangeable, and the sliders may be easily exchanged for a variety of configurations. Therefore, the manufacturing system 100 disclosed herein allows a variety of processing options thereby providing significant versatility. The manufacturing system 100 disclosed herein can be a balanced and scalable system with improved station utilization, granular processing, and a wide range of processing capabilities. Compared to conventional manufacturing systems, the manufacturing system 100 disclosed herein is generally of lower cost.

Figure 35:
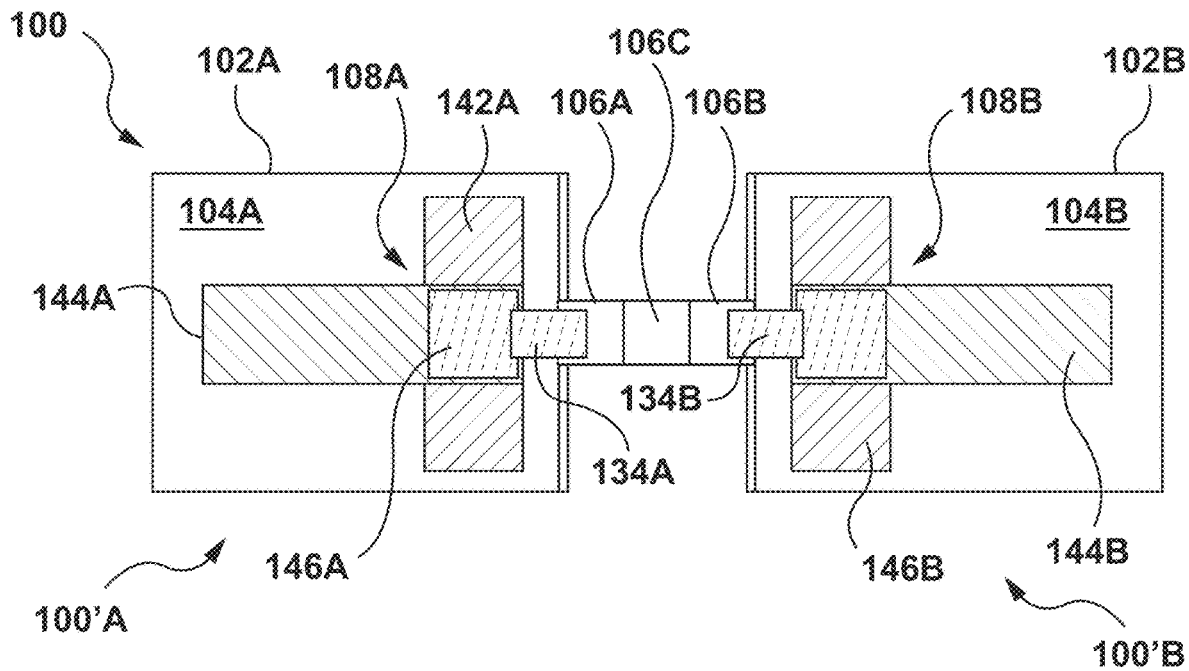
FIG. 35 is a plan view of two manufacturing system shown in FIG. 1 acting as manufacturing modules and coupled to each other with a common workplace therebetween.

In a further embodiment, illustrated in FIG. 35, the manufacturing system 100 may include two manufacturing modules 100'A and 100'B coupled together in a modular fashion. As described herein, each of the manufacturing modules 100'A and 100'B includes a manufacturing area 104A, 104B having therein a workspace 106A, 106B and a manufacturing component 108A, 108B. The manufacturing system 100 includes a common workplace 106C between the two manufacturing areas 104A and 104B.

Figure 36:
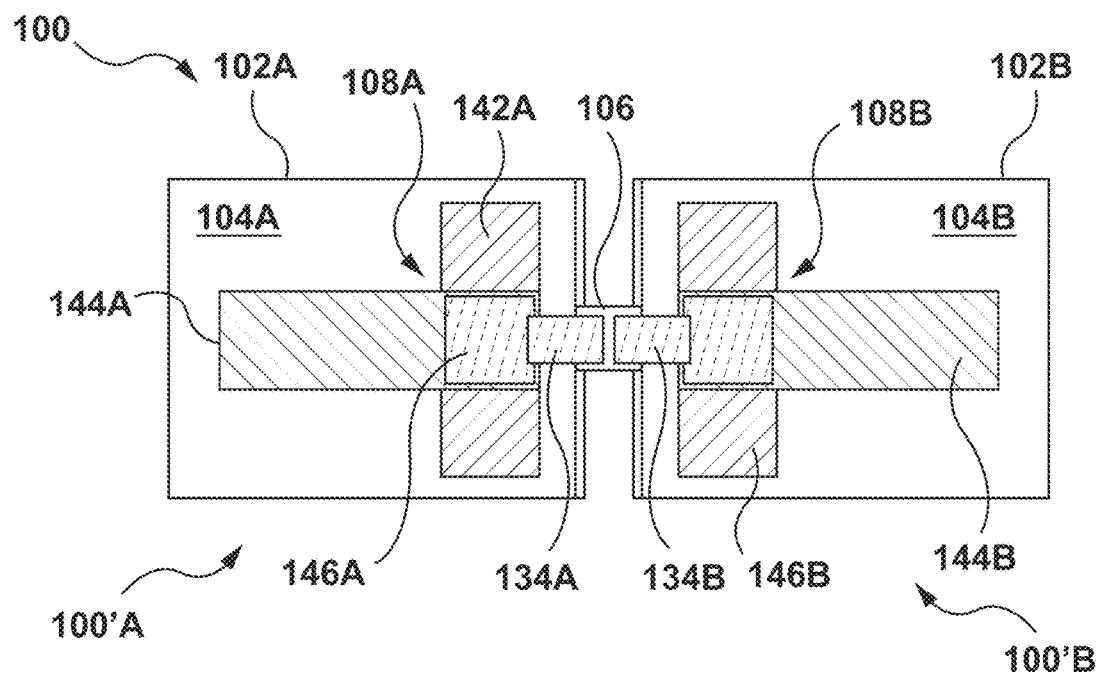
FIG. 36 is a plan view of two manufacturing system shown in FIG. 1 acting as manufacturing modules and coupled to each other and sharing a common workplace therebetween.

In another embodiment illustrated in FIG. 36, the manufacturing system 100 includes two manufacturing modules 100'A and 100'B coupled together in a modular fashion. Each of the manufacturing modules 100'A and 100'B includes a manufacturing area 104A, 104B receiving therein a manufacturing component 108A, 108B. The manufacturing system 100 includes a common workplace 106 between the two manufacturing areas 104A and 104B and accessible to the manufacturing components 108A and 108B for operations during a manufacturing cycle.

Those skilled in the art will appreciate that the components of the manufacturing system 100 disclosed herein may be made of suitable materials such as steel, aluminum, alloy, and/or the like.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments described herein or elements thereof are implemented as a software routine, hardware circuit, firmware, or a combination thereof.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A system for manufacturing comprising:
   a cell framework defining a manufacturing area;
   at least one workplace within the manufacturing area;
   at least one manufacturing component within the manufacturing area, the at least one manufacturing component comprising a C-shape frame (C-frame) and a sliding structure, the sliding structure comprising a lateral slider base, a lateral slider, and a column, wherein horizontal rails are provided on the lateral slider base for horizontally guiding movement of the lateral slider in an x-direction, wherein horizontal rails are provided on the lateral slider for horizontally guiding movement of the column in a y-direction orthogonal to the x-direction, and wherein the C-frame is provided on the column so as to be vertically movable along and relative to the column in a z-direction, wherein the C-frame is mounted on the sliding structure such that the C-frame is movable in the x-direction, the y-direction, and the z-direction in relation to the at least one workplace;
   a press provided to the C-frame, the press comprising a press arm; and
   a tool exchanger provided to the C-frame, the tool exchanger comprising a plurality of tools,
   wherein the tool exchanger is configured such that the press moves the tool exchanger between an indexing mode position and an operation mode position and the press arm is configured to, when the tool exchanger is moved to operation mode position, engage with a selected tool of the plurality of tools of the tool exchanger to operate the selected tool.

2. The system for manufacturing according to claim 1, wherein the press is supported by the C-frame and the press operates along a horizontal axis.

3. The system for manufacturing according to claim 1, wherein the C-frame is movable in relation to the at least one workplace during a manufacturing cycle for positioning of the C-frame in relation to a part in the at least one workplace.

4. The system for manufacturing according to claim 1, wherein the C-frame is movable in relation to the at least one workplace during a manufacturing cycle such that multiple operations can be performed on a part by the C-frame.

5. The system for manufacturing according to claim 1, wherein the at least one workplace comprises at least two workplaces, wherein the at least two workplaces comprise a first workplace that is accessible to the at least one manufacturing component and a second workplace that is accessible to an operator for manual operations, and wherein the system further comprises a pallet configured to be movable between the at least two workplaces.

6. The system for manufacturing according to claim 1, wherein the at least one manufacturing component comprises at least two manufacturing components, and wherein the at least one workplace and the at least two manufacturing components are each positioned and oriented in the manufacturing area to allow each of the at least two manufacturing components to operate on a part at the at least one workplace substantially simultaneously.

7. The system for according to claim 1, wherein the manufacturing area comprises a first manufacturing area, the system further comprises a second manufacturing area attached to the first manufacturing area in a modular fashion, the at least one workplace comprises a common workplace, and wherein the second manufacturing area is positioned and oriented to position the common workplace between the first and second manufacturing areas.

8. The system according to claim 1, further comprising pneumatic cylinders for adjusting a height of the C-frame in the vertical z-direction.

9. The system according to claim 1, wherein the at least one workplace is accessible to the press inside the cell framework to perform an automatic operation.

10. The system according to claim 9, wherein the system comprises at least one additional workplace, wherein the at least one additional workplace is positioned outside the cell framework and is accessible to an operator for completing a manual operation.

* * * * *